(12) United States Patent
Valinsky et al.

(10) Patent No.: US 10,940,998 B2
(45) Date of Patent: Mar. 9, 2021

(54) AUTOMATED STORAGE AND RETRIEVAL SYSTEM

(71) Applicant: Opex Corporation, Moorestown, NJ (US)

(72) Inventors: Joseph Valinsky, Moorestown, NJ (US); Robert R. DeWitt, Marlton, NJ (US); Alexander Stevens, Philadelphia, PA (US); Dhruva Kumar, Narbeth, PA (US)

(73) Assignee: OPEX Corporation, Moorestown, NJ (US)

( * ) Notice: Subject to any disclaimer, the term of this patent is extended or adjusted under 35 U.S.C. 154(b) by 193 days.

(21) Appl. No.: 15/905,810

(22) Filed: Feb. 26, 2018

(65) Prior Publication Data

US 2018/0251302 A1 Sep. 6, 2018

Related U.S. Application Data

(60) Provisional application No. 62/463,352, filed on Feb. 24, 2017.

(51) Int. Cl.
*G06F 7/00* (2006.01)
*B65G 1/137* (2006.01)
(Continued)

(52) U.S. Cl.
CPC ......... *B65G 1/1373* (2013.01); *B65G 1/0435* (2013.01); *B65G 1/10* (2013.01);
(Continued)

(58) Field of Classification Search
CPC ...... B65G 1/1373; B65G 1/0435; B65G 1/10; B65G 2814/0347; B65G 2814/0352
(Continued)

(56) References Cited

U.S. PATENT DOCUMENTS

| | | |
|---|---|---|
| 3,547,282 A | 12/1970 | Hartbauer et al. |
| 7,861,844 B2 | 1/2011 | Hayduchok et al. |

(Continued)

FOREIGN PATENT DOCUMENTS

| | | |
|---|---|---|
| DE | 2223561 | 1/1974 |
| DE | 3805712 | 9/1989 |

(Continued)

OTHER PUBLICATIONS

U.S. Appl. No. 16/557,100, filed Aug. 30, 2019.
(Continued)

*Primary Examiner* — Yolanda R Cumbess
(74) *Attorney, Agent, or Firm* — Stephen H. Eland

(57) ABSTRACT

A method and apparatus are provided for storing or retrieving items to/from a plurality of destinations areas. The items are loaded onto one of a plurality of independently controlled delivery vehicles. The delivery vehicles follow a path to/from the destination areas that are positioned along the path. The destination areas are configured such that the destination areas have a depth to accommodate a plurality of containers in a horizontal line one behind another. The containers may be releasable interconnected so that retrieving one of the interconnected containers displaces one or more connected containers.

28 Claims, 13 Drawing Sheets

(51) Int. Cl.
*B65G 1/04* (2006.01)
*B65G 1/10* (2006.01)

(52) U.S. Cl.
CPC ............... *B65G 2814/0347* (2013.01); *B65G 2814/0352* (2013.01)

(58) Field of Classification Search
USPC .................. 700/213–214, 216, 218, 228
See application file for complete search history.

(56) References Cited

U.S. PATENT DOCUMENTS

| | | |
|---|---|---|
| 8,104,601 B2 | 1/2012 | Hayduchok et al. |
| 8,276,740 B2 | 10/2012 | Hayduchok et al. |
| 8,622,194 B2 | 1/2014 | DeWitt et al. |
| 9,010,517 B2 | 4/2015 | Hayduchok et al. |
| 9,334,116 B2 | 5/2016 | DeWitt et al. |
| 9,687,833 B2 | 6/2017 | Kanaya et al. |
| 9,815,625 B2 | 11/2017 | DeWitt et al. |
| 10,052,661 B2 | 8/2018 | Hayduchok et al. |
| 10,071,857 B2 | 9/2018 | DeWitt et al. |
| 10,457,483 B2 | 10/2019 | DeWitt |
| 2002/0037208 A1 | 3/2002 | Donato |
| 2009/0074545 A1* | 3/2009 | Lert, Jr. ............... B65G 1/0492 414/276 |
| 2015/0197397 A1* | 7/2015 | Razumov ............ B65G 1/0492 414/279 |
| 2018/0290830 A1 | 10/2018 | Valinsky et al. |

FOREIGN PATENT DOCUMENTS

| | | | |
|---|---|---|---|
| DE | 102006049411 | 4/2008 | |
| DE | 102008010060 | 9/2009 | |
| DE | 202010003476 | 7/2011 | |
| DE | 102012107176 | 2/2014 | |
| EP | 126431 | 11/1984 | |
| EP | 1193195 | 4/2002 | |
| EP | 1193195 A2 * | 4/2002 | ........... B65G 1/0435 |
| EP | 2199248 | 6/2010 | |
| JP | S61150908 | 7/1986 | |
| WO | 2013/155107 | 10/2013 | |
| WO | 2015007514 | 1/2015 | |
| WO | 2016172253 | 10/2016 | |
| WO | 2016199033 | 12/2016 | |

OTHER PUBLICATIONS

International Search Report issued in International Application No. PCT/US18/19791 dated May 29, 2018.
Search Report and Written Opinion for Singapore Application No. 11201907621P dated Nov. 17, 2020.

* cited by examiner

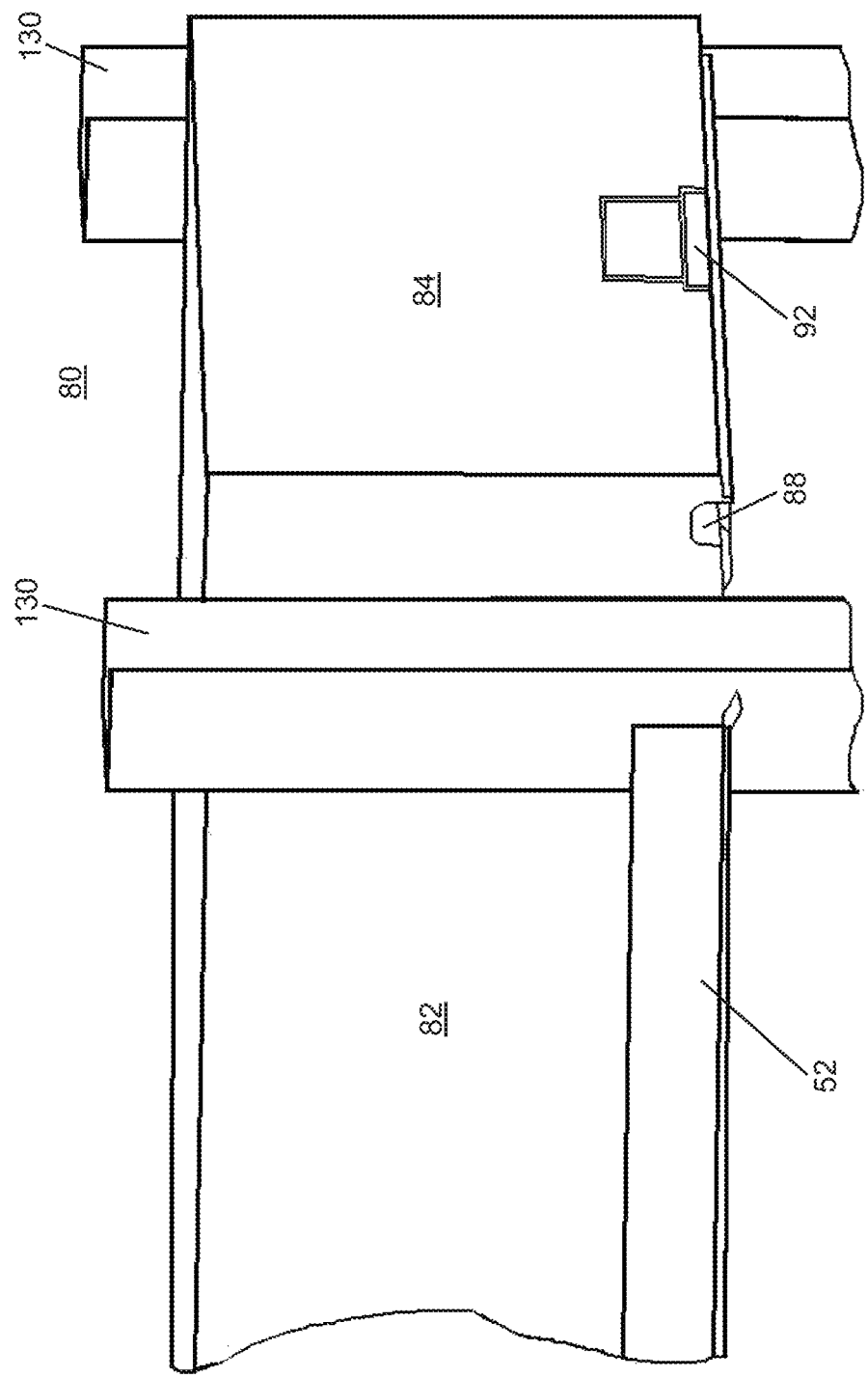

AUTOMATED STORAGE AND RETRIEVAL SYSTEM

PRIORITY CLAIM

This application claims priority to U.S. Provisional Patent Application No. 62/463,352 filed on Feb. 24, 2017. The entire disclosure of the foregoing application is incorporated herein by reference.

TECHNICAL FIELD

This disclosure relates to material handling systems for conveying one or more objects from a first location to a second location and, more particularly, to automated storage and retrieval systems in which a plurality of containers are stored in a plurality of storage locations in which some containers are behind other storage containers.

BACKGROUND

Many large organizations have extensive storage areas in which numerous and diverse items are stored and/or from which they are retrieved, for example, to fill customer orders. Storing items into and retrieving the items from the hundreds or thousands of storage areas requires significant labor to perform manually. In many fields, automated picking has developed to reduce labor cost and improve customer service by reducing the time it takes to fill a customer order. Frequently, there is a trade-off between several variables in setting up a system, such as storage density, accessibility, footprint, cost, just to name a few. For instance, increasing storage density in an automated storage and retrieval (ASR) system can reduce both the cost and the space requirements ("footprint") for such a system. If the storage density of an ASR system is too high, however, the reduced ease and speed with which individual items can be stored and retrieved may render the system unsuitable for many applications.

By way of illustrative example, some ASR systems utilize a conveying system that includes a plurality of independently operated vehicles. Such a system may be configured as an aisle with storage locations on either side of the aisle and the vehicles travelling along a path within the aisle. The capacity of the system can be increased by making the aisle taller or longer. Alternatively, additional aisles may be added. However, in many situations, either the space may not be available for such as system or the cost may exceed the benefit of the increased capacity. Accordingly, in some applications there exists a need for an ASR system with that increases the storage density at a lower cost and in a smaller foot print, without significantly affecting throughput of the system.

SUMMARY OF THE DISCLOSURE

In light of the foregoing, a system provides a method and apparatus for storing and retrieving items. The system includes a plurality of storage locations or destination areas, and a plurality of delivery vehicles for delivering items to or retrieving items from the destination areas. The delivery vehicles follow paths to the destination areas.

The present invention may also provide an improved material handling system in which storage containers in which independently operable vehicles are operable to deliver storage containers into and retrieve storage containers from storage locations having sufficient depth to accommodate multiple storage containers in a horizontal orientation with one storage container positioned behind another. The system may include a track for guiding the vehicles along the track to the storage locations. Additionally, the storage locations may be arranged so that the storage locations are vertically separated from one another. For example, the storage locations may be configured as an array of storage locations in a plurality of rows or columns. The storage containers may also be releasably connectable with adjacent storage containers so that displacement of a first storage container in a first storage location displaces a second storage container within the first storage location.

The present invention also provides a material handling system for storing or retrieving a plurality of items that includes a plurality of independently operable vehicles for delivering and retrieving items to a destination. Optionally, the system includes a track for guiding the vehicles. The system includes a plurality of storage locations wherein a plurality of the storage locations are vertically spaced apart from one another. The storage locations may be positioned along the track is the system includes a track. The system also includes a plurality of storage containers. One or more of the storage locations are configured to receive a plurality of the storage containers. The storage containers include connectors for interconnecting connecting storage containers stored adjacent one another in a storage location. The connectors connect the storage containers so that displacement of one of the containers in a storage location discloses the interconnected container or containers in the same storage location. The vehicles may include a transfer mechanism configured to transfer storage containers between the vehicle and storage locations. The transfer mechanism may be operable to displace first and second interconnected containers when the first or second container is displaced relative to the vehicle.

According to another aspect the material handling system may include a track system having a plurality of generally horizontal track sections spaced apart from one another. The track system may also include a plurality of generally vertical track sections spaced apart from one another. The vertical and horizontal track sections may be interconnected to form a track loop.

According to yet another aspect, the present invention provides storage containers for a material handling system in which the storage containers have first and second connectors that are connectable to provide a connection that impedes horizontal displacement of a first storage container relative to a second storage container. The connection of the first and second connectors may be sufficient to support the weight of the second container during horizontal displacement such that displacing the first container horizontally displaces the second container horizontally when the first and second connectors are connected. Additionally, the connection of the first and second connectors may permit vertical displacement of the first container relative to the second container.

According to another aspect, the system may provide storage containers having first and second connectors for releasably connecting first and second storage containers wherein the first and second connectors are configured such that displacement of the first connector vertically relative to the second connector disconnects the first connector from the second connector.

The present invention further provides storage containers having first and second connectors for interconnecting the storage containers with one another, wherein the first connector comprises a tongue and the second connector comprises a groove configured to receive the tongue.

According to another aspect, the present invention provides a storage location in which first and second containers are located and the storage location is configured to house the first and second containers in horizontal alignment in which the first container is positioned in front of the second container. Optionally, the storage location may be configured so that when a delivery vehicle is aligned with the first container, the first container separates the second vehicle from the delivery vehicle.

The present invention further provides a material handling system having a plurality of storage locations each configured to store a plurality of storage containers. Optionally, the storage locations each have a depth and first and second one of the storage containers each have a length and the depth of the one storage location is at least as long as the combined length of the first and second containers.

According to another aspect, the present invention provides delivery vehicles for a material handling system and each vehicle has a generally planar platform for receiving the containers.

According to yet another aspect, the present invention provides a material handling system that includes a first rack of storage locations spaced apart from a second rack of storage locations so that an aisle is formed between the first rack and the second rack.

Optionally, the material handling system may include a pick station disposed at an end of aisle. Vehicles may deliver storage containers to the pick station so that operators can retrieve items from the storage containers at the pick station.

According to another aspect, the system may include vehicles that are displaceable within an aisle. The vehicles may comprise drive wheels that engage a track and racks of storage locations may be positioned relative to the track so that storage containers project horizontally into the aisle beyond the track.

According to a further aspect, the present invention provides containers for a material handling system and the containers contain one or more engagement elements configured to engage a transfer mechanism of vehicles that deliver the containers.

According to a further aspect, the present invention provides a container for use in a material handling system for storing or retrieving a plurality of items. The container includes a plurality of walls and first and second connectors configured to be connectable to form a releasable connection between two of the storage containers. The storage container may include an engagement element configured to cooperate with a transfer mechanism of the material handling system to displace the storage container horizontally. Additionally, the material handling system may include storage locations and the container may have a length that is at less than or equal to half the depth of the storage location so that two of the containers will fit in the storage location when the two containers are connected together. The first and second connectors may also be connectable to form a releasable connection.

Still further, the present invention may provide a combination of first and second containers for use in a material handling system. The two containers may be similarly configured so that a first connector of the first container is connectable with a second connector of the second container to connect the two containers such that horizontal displacement of the first container by a transfer mechanism of a delivery vehicle displaces the second container. Optionally, the connection of the first connector of the first container and the second connection of the second container impedes horizontal displacement of the first container relative to the second container.

The present invention also provides a method for storing and retrieving containers from a plurality of storage locations. The method includes the step of driving a first vehicle with a first storage container along a transport path among a plurality of storage locations. The first storage container is unloaded from the first vehicle into a first storage location. The first storage container is releasably connected with a second storage container in the first storage location. The first vehicle is then displaced away from the first storage location after the step of unloading.

According to another aspect, a method for storing and retrieving containers includes the step of disconnecting a first storage container in a storage location from a second storage container in the storage location. Optionally, the step of releasably connecting comprises displacing the first container vertically relative to the second container.

According to a further aspect, a method for storing and retrieving containers using vehicles includes the step of disconnecting first and second connected containers by displacing the first container vertically relative to the second container.

According to yet another aspect, a method for storing and retrieving containers using vehicles includes the step of loading a first storage container onto a vehicle after a step of releasably connecting the first storage container and a second storage container such that during the step of loading the first storage container pulls the second storage container toward the vehicle.

According to a further aspect, a method for storing and retrieving containers using vehicles includes the step of unloading a first storage container into a storage location. The step of unloading comprises pushing the first storage container against a second storage container to drive the second container deeper into the storage location. The step of unloading may include the step of actuating an unloading mechanism on the first vehicle to drive the first storage container off the first vehicle.

BRIEF DESCRIPTION OF THE DRAWINGS

The foregoing summary and the following detailed description of the preferred embodiments of the present invention will be best understood when read in conjunction with the appended drawings, in which:

FIG. 11 is a fragmentary perspective view of a portion of a storage rack of the apparatus illustrated in FIG. 1;

DETAILED DESCRIPTION

Figure 1:
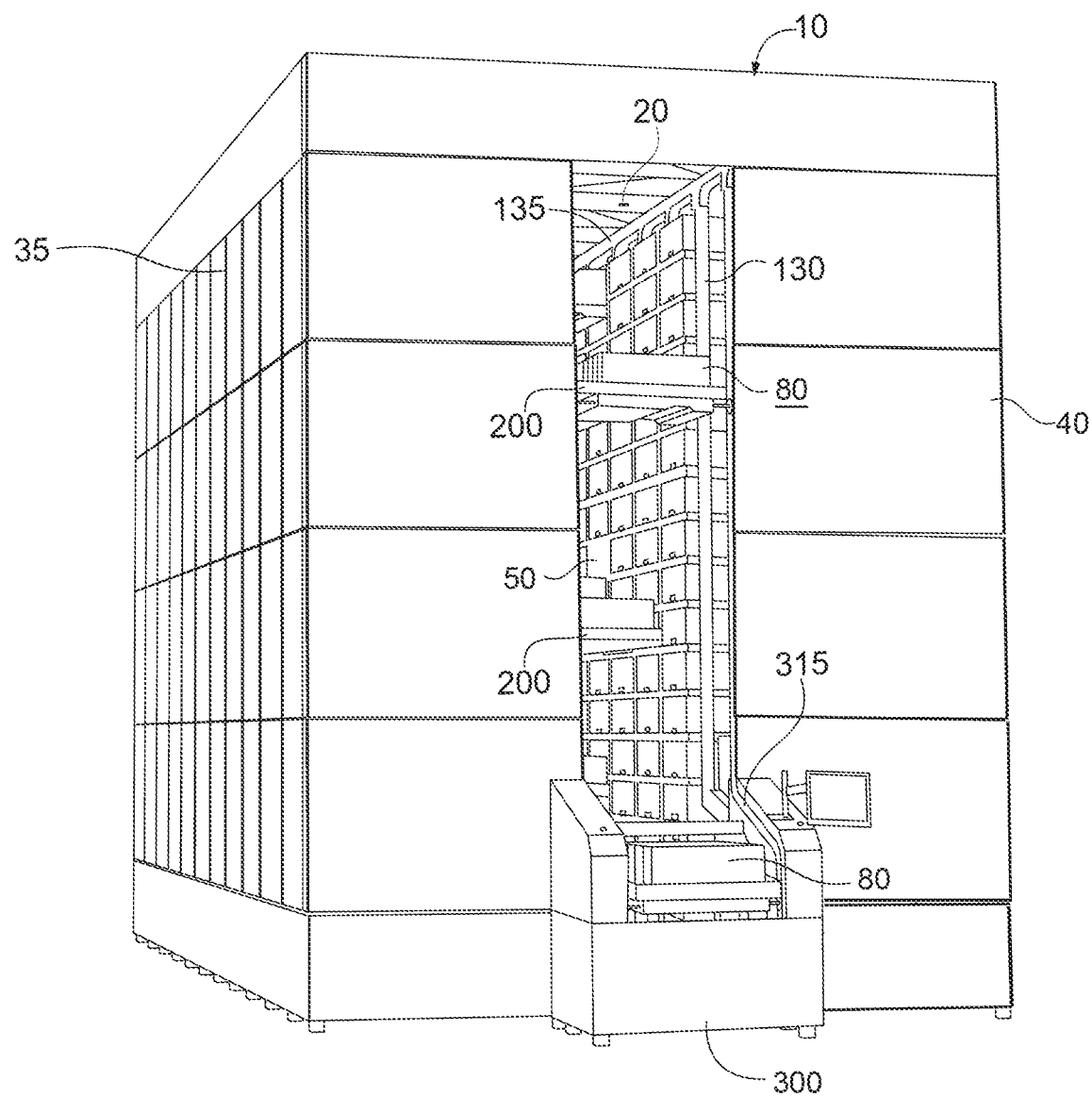
FIG. 1 is a perspective view of a storing and retrieving apparatus.

Referring now to the figures in general and to FIG. 1 specifically, a material handling apparatus adapted to store and/or retrieve items is designated generally 10. The apparatus 10 includes a plurality of vehicles for transporting items along a transport path between a first location and a second location. In some embodiments, consistent with the present disclosure, the first location is a storage location selectable from among a plurality of storage locations 50 in one or more storage racks and the second location is an article transfer station 300 where items may be picked, sorted and/or transferred from or to receptacles for storage, such as storage containers 80. The apparatus 10 moves items (or containers which contain items) along the conveying path.

In some embodiments, the apparatus includes a plurality of transport vehicles or vehicles 200 that travel along one or more pathways in an aisle 20 adjacent one or more racks 35, 40 that are configured to store a plurality of storage containers 80. For instance, as shown in FIG. 1, the aisle 20 may be an elongated aisle formed between a pair of racks 35, 40 so that the vehicles move within the aisle along one or more pathways. A track 110 may provide one or more pathways within the aisle for the vehicles to travel to storage locations in the racks. For instance, an embodiment may include a front track 115 adjacent a front rack 35 on one side of the aisle. A rear track 120 adjacent a rear rack 40 may be spaced apart from the front track 115 to form the aisle 20. The vehicles 200 may move within the aisle 20 along the track. For instance, the vehicle may be supported by one or more front wheels that engage the front track 115 and one or more rear wheels that engage the rear track 120.

Each storage rack 35, 40 provides a plurality of storage locations 50 for storing containers 80 that store various items. The vehicles move along the track 110 to storage locations. At a storage location 50, a vehicle can transfer an item from the vehicle into one of the storage locations. Similarly, the vehicle can transfer an item from one of the storage locations onto the vehicle. Additionally, the system may be configured so that the vehicle transfers an item from the vehicle to a storage location while at the same time transferring an item from a different storage location onto the vehicle. The storage locations may be arranged as an array of locations adjacent the aisle. Additionally, as discussed further below, the racks 35, 40 may provide storage depth so that the storage containers may be stored two or more deep to increase the storage density of the storage containers 80 in the racks.

Storage Racks

The details of the storage rack 35, 40 and the storage locations in the storage racks will now be described in greater detail. Referring to FIG. 1, the system may include one or more storage racks 35, 40. Each storage rack may provide an array of destination areas or storage locations 50 for receiving items. The storage locations 50 may be arranged in columns, however, the storage locations may be arranged in any of a variety of configurations, such as rows. In the following description, the system is described as delivering and/or retrieving items to and from storage areas 50. The items may be configured so that an individual item is stored at a storage location. However, in a typical operation environment, the items are stored in or on a storage mechanism, such as a container or platform.

Referring now to FIGS. 8-12, the storage racks 35, 40 and in particular, the storage locations 50 will be described in greater detail. The storage locations 50 can be any of a variety of configurations. For instance, the simplest configuration is a shelf for supporting the items or the container holding the items. Similarly, the storage locations 50 may include one or more brackets that cooperate with the storage mechanism to support the storage mechanism in the storage location.

Figure 8:
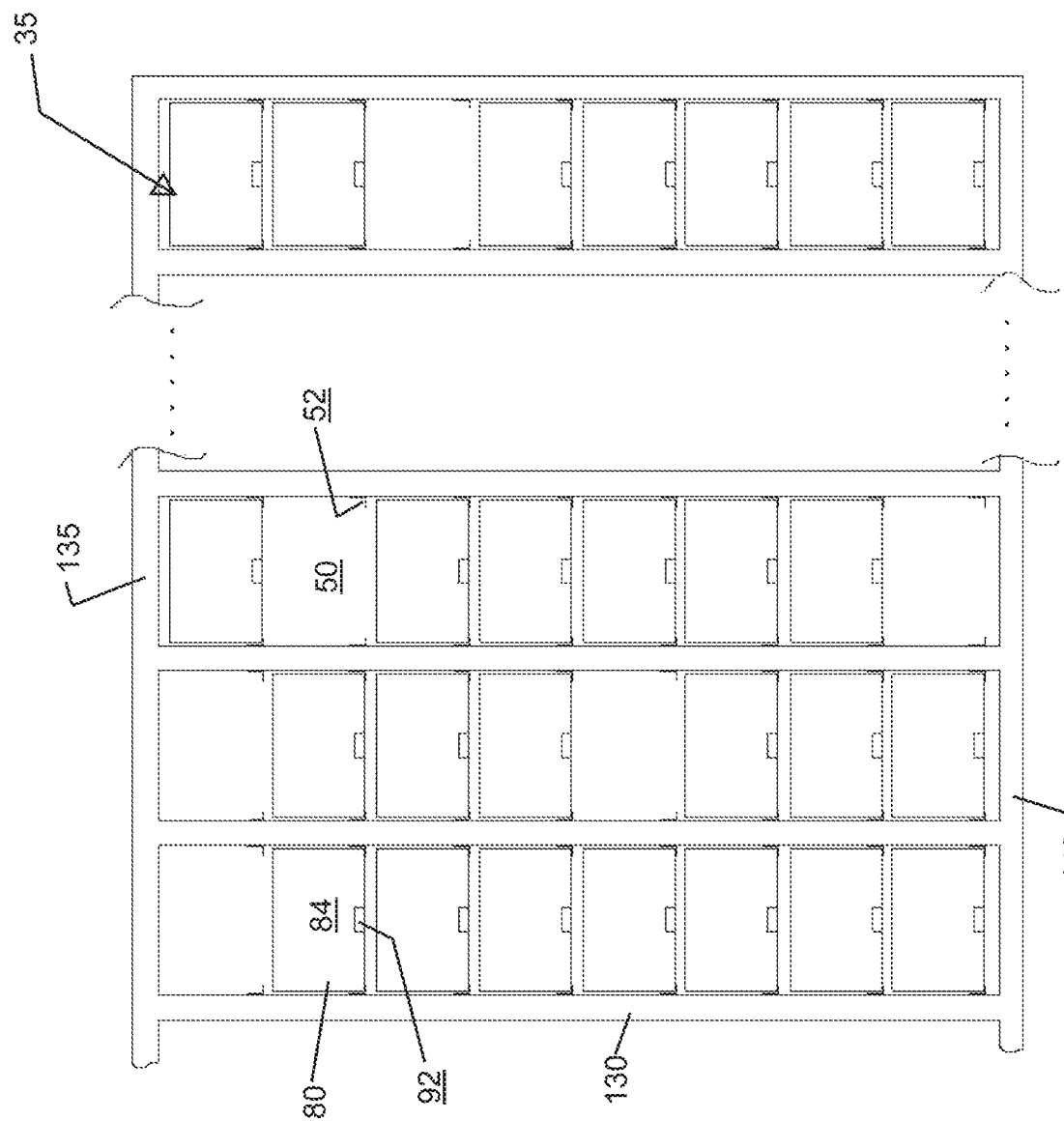
FIG. 8 is a side diagrammatic view of a plurality of storage locations of the apparatus illustrated in FIG. 1.
Figure 12:
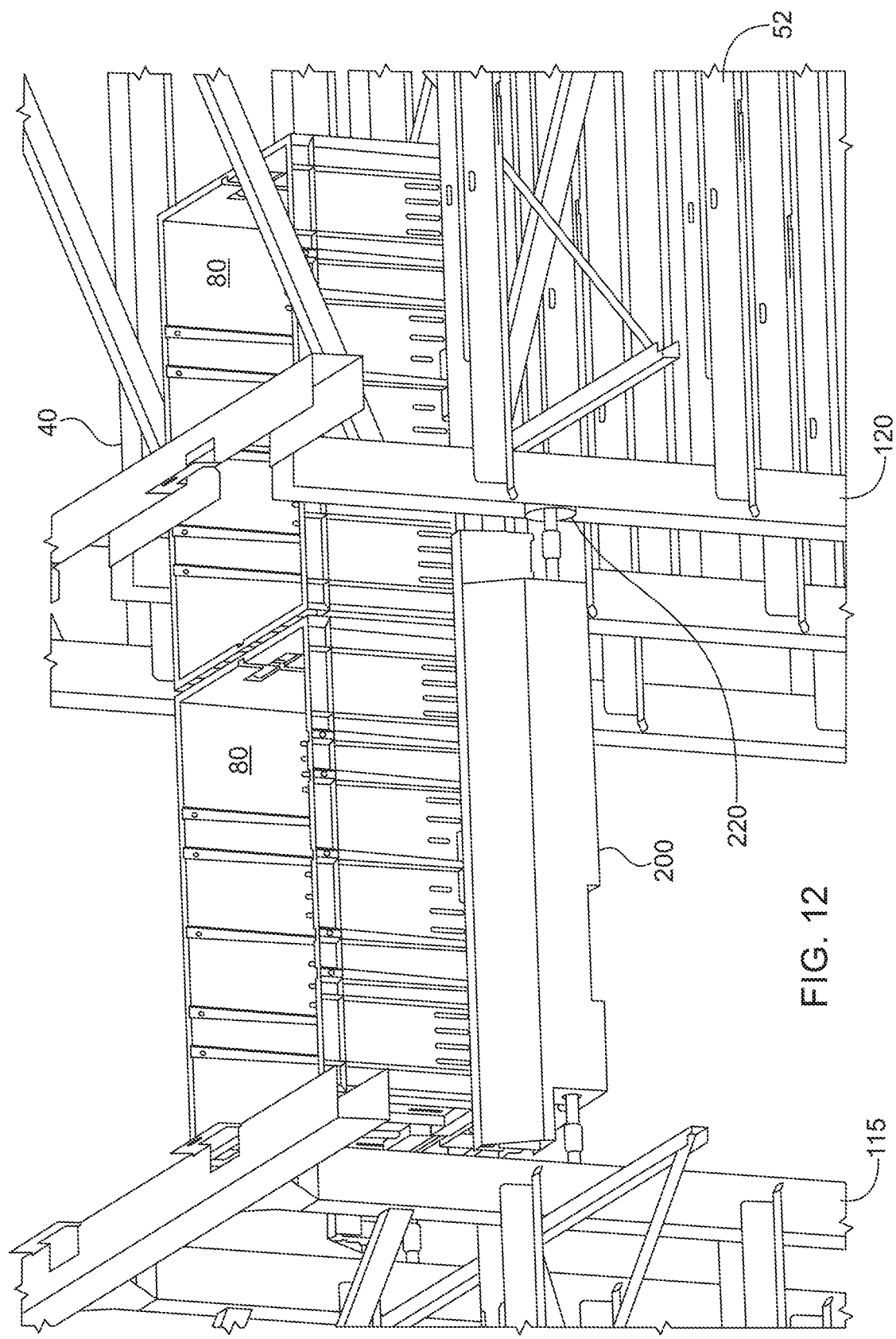
FIG. 12 is a fragmentary perspective view of a portion of a storage rack of the apparatus illustrated in FIG. 1 including a vehicle of the apparatus.

As shown in FIGS. 8 and 11-12, the rack 35 may include a plurality of vertical supports, such as vertical beams, interconnected with a plurality of horizontal supports, such as horizontal beams. In the present instance, the track 110 may form part of the vertical and horizontal support beams. For instance, the rack 35 may comprise an array of columns, with each column formed by a plurality of supports. Each column may be defined by two front vertical support beams and two rear vertical support beams. As shown in FIG. 11, the front vertical beams may comprise the vertical legs 130 of the track. Each column may include a plurality of storage areas 50. In particular, each column is separated into a plurality of storage areas or cells 50. Each cell includes a support element for supporting a container to that the container can be stored in the cell. The support elements may be any of a variety of elements for supporting a container in the storage location. For instance, each storage location may include a shelf or other horizontal support onto which a container may be placed. For instance, as shown in FIGS. 8 and 11-12, the rack 35 may include a plurality of brackets, such as L-channels 52 attached to the vertical supports 130. The brackets 52 may extend substantially the depth of each storage location 50. In this way, each storage location 50 may be defined as the area extending between adjacent vertical supports and extending upwardly from adjacent a pair of horizontal supports elements 52 to a point adjacent an upper pair of horizontal supports or the top of the rack.

Additionally, as shown in FIG. 11, each storage location 50 may be configured so that the containers 80 project inwardly toward the aisle so that the inner end of the container projects inwardly beyond the vertical supports. In other words, the containers 80 may be stored in the storage locations 50 so that the inner edge of the container (with respect to the aisle 20) overhands into the aisle.

Figure 9:
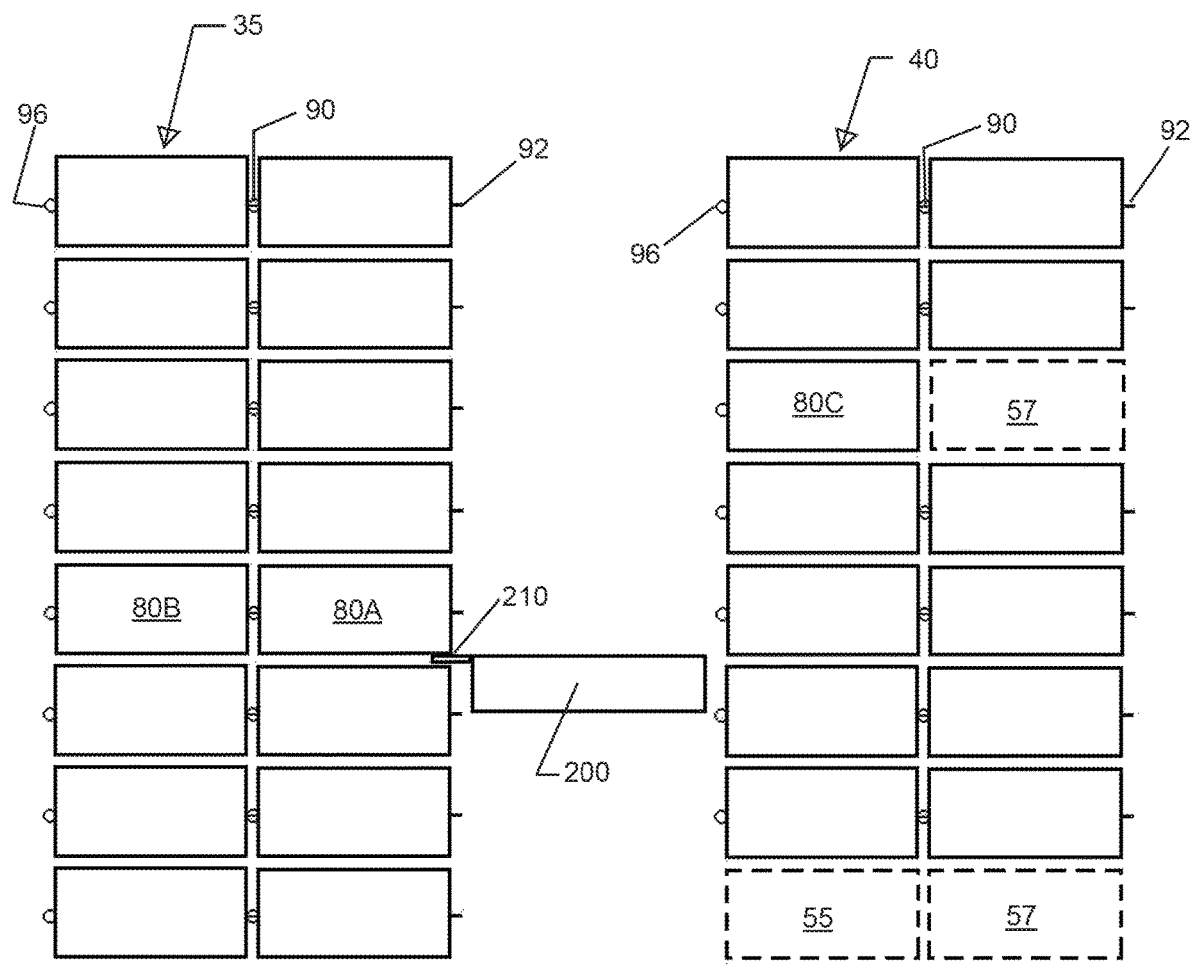
FIG. 9 is diagrammatic side view of storage containers in the storage locations of the apparatus illustrated in FIG. 1.

Referring now to FIG. 9, the racks may be configured so that one or more of the storage locations 50 is deep enough to accommodate a plurality of containers. For example, one or more of the storage locations are at least approximately twice as deep as the storage containers 80 so that two storage containers can be stored, with one storage container stored behind the other storage container. It should be understood that the storage locations may be configured to accommodate any number of storage containers. For instance, the racks 35, 40 may be configured so that one or more of the storage locations can accommodate three containers, so that the containers are three-deep. In such an embodiment, the storage location 50 is approximately three times as deep as the length of the storage container 80. Similarly, the depth of the rack can be increased to be approximately "n" times the length of the storage containers to accommodate "n" storage containers stored "n" deep, wherein "n" is an integer.

In the exemplary arrangement of FIG. 9, the system is illustrated in connection with an arrangement for storing containers in a "n" deep arrangement, in which "n"=2. Although the apparatus may include only a single rack on one side, in FIG. 9, the system is illustrated with two racks, front rack 35 and rear rack 40. Additionally, each rack is illustrated as being configured to accommodate containers in a two-deep arrangement. However, it should be understand that the racks 35, 40 do not need to be configured to accommodate the same number of containers. For instance, the front rack may be configured as a two-deep rack and the rear rack 40 may be configured as a single deep rack.

In the following discussion, the storage locations will be described relative to the arrangement illustrated in FIGS. 8-9. Each storage location 50 includes an inner storage location 55 and an outer storage location 57. Each of the inner and outer storage location 55, 57 is configured to accommodate a container 80. The inner storage locations 55 are adjacent the aisle 20. The outer storage locations 57 are behind the inner storage locations 55, so that the inner storage location separates the outer storage location from the aisle 20 and the vehicle 200. In the present instance, the inner storage location 55 has a depth that is approximately the same as the length of a container 80. Similarly, the outer storage location 57 has a depth that is approximately the same as the length of the container 80. The outer storage locations 57 may be considered remote storage locations because they are separated from the aisle by an inner storage location. In a system having a depth of greater than two, the remote locations include storage locations that are separated from the aisle by an inner storage location and one or more outer storage locations.

As discussed previously, the system may include a plurality of vehicles 200 that are conveyed to the storage locations to transfer items to and from the storage locations. In particular, the vehicles 200 may include a loading/unloading mechanism to transfer items into a storage location 50 or withdraw an item from the storage location. In an embodiment in which the storage containers are stored two or more deep, the system is configured so that the vehicles are able to retrieve containers stored in one of the remote storage locations. For instance, each vehicle may include a loading element that extends outwardly to a remote storage location to engage a storage container in a remote storage location to move the container to an inner storage location and/or to load the container onto the vehicle from the remote storage location. Alternatively, a separate mechanism may be utilized to move containers from a remote storage location to an inner storage location. For instance, the rack may include a drive mechanism operable to drive a container toward the aisle from a remote storage location. The drive mechanism may be separately powered or may interact with a drive mechanism from one of the vehicles. Yet another alternative is to interconnect a container in a remote storage location with an adjacent container such that displacing one of the containers displaces both containers. For instance, a container in a remote storage location may be releasably connected with a container in an inner storage location. When the container in the inner storage location is moved toward the aisle 20, the container in the remote storage location is displaced toward the inner storage location.

Figure 13:
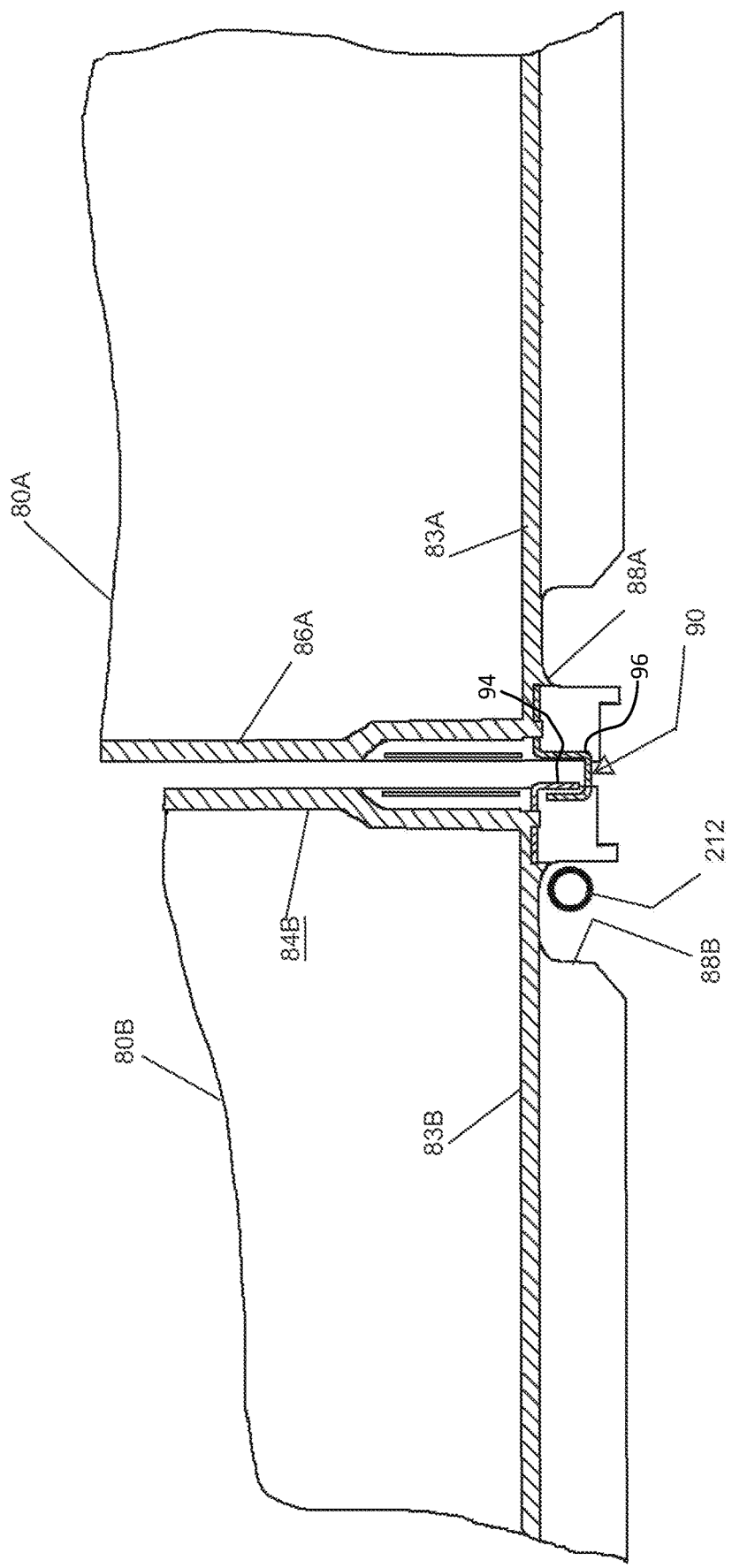
FIG. 13 is a fragmentary side view of a releasable connection between storage containers of the apparatus illustrated in FIG. 1, in which the storage containers are connected.

Referring now to FIGS. 11-14, the storage containers 80 are configured to connect with adjacent containers. In particular, the storage containers are configured to releasably connect with one or more adjacent containers. For instance, as shown in FIG. 13, a releasable connector 90 connects two adjacent containers 80A, 80B. The releasable connector selectively connects the two containers. In this way, displacing container 80A horizontally also displaces container 80B. Additionally, the releasable connector 90 may inhibit relative motion in one direction, while allowing relative motion in a second or transverse direction. For example, the connection may connect containers 80A and 80B so that horizontal displacement of one container also displaces the other container. At the same time the releasable connector may be configured to allow vertical displacement of one container relative to the other. In the embodiment illustrated in FIGS. 11 and 13-14, the releasable connector 90 is configured to permit relative vertical displacement to connect or disconnect two adjacent containers as discussed further below.

In the following discussion, the details of an exemplary storage container 80 are provided. The container 80 may be similar to a carton or box without a lid, so that an operator can easily reach into the container to retrieve an item at the picking station. Although the present system is described as using containers, it should be understood that any of a variety of storage mechanisms can be used, such as pallets or similar platforms. Accordingly, in the following discussion, the term container is intended to include items intended to store and/or support items, including, but not limited to a pallet, platform, tray, carton, box, receptacle or similar structure.

The storage container 80 may be rectangular prism having a generally planar bottom 83. The bottom 83 is substantially horizontal, forming a platform for receiving items. The container may also include a plurality of generally vertical walls extending upwardly from the bottom 83. For instance, the container 80 may include generally parallel side walls 82. The container may include a forward wall 84 that projects upwardly from the bottom 83. The front face may extend between side walls 82 to connect the side walls. Additionally, the container may include a rear wall 86 that projects upwardly from the bottom. The rear wall 86 may be generally parallel with the front wall 84. The rear wall 86 may also extend between the side walls 82 to connect the side walls. Accordingly, the walls (82,83,84,86) of the container 80 define an interior space in which items can be stored.

The containers 80 may include one or more elements configured to cooperate with the vehicles to transfer the containers onto or off of the vehicles 200. For instance, the containers may include a hook, detent, socket, or other physical structure configured to cooperate with the vehicles. In the present instance, the containers may include a retention slot or groove 88 configured to cooperate with a loading/unloading element 212 of the vehicles. The retention groove 88 may be formed in the underside of the container 80, below the bottom 83. The retention groove 88 may be spaced rearwardly from the front face 84 of the container as shown in FIGS. 11 and 13. The retention groove 88 may extend substantially the entire width of the container. The groove may also have open ends on both sides 82 as shown in FIGS. 11 and 13 so that the groove is a through slot. As shown in FIG. 13, the groove may have a depth that is deeper than the thickness of the loading/unloading element 212 of the vehicle 200 so that the loading/unloading element remains nested within the groove to drive the container inwardly or outwardly when the loading/unloading element is displaced horizontally. The container 80 may also include a second groove or slot 88 adjacent the rearward wall 86. The second groove may be configured substantially similarly to the first wall and may be formed adjacent the rearward wall, spaced forwardly from the rearward wall 86.

Figure 14:
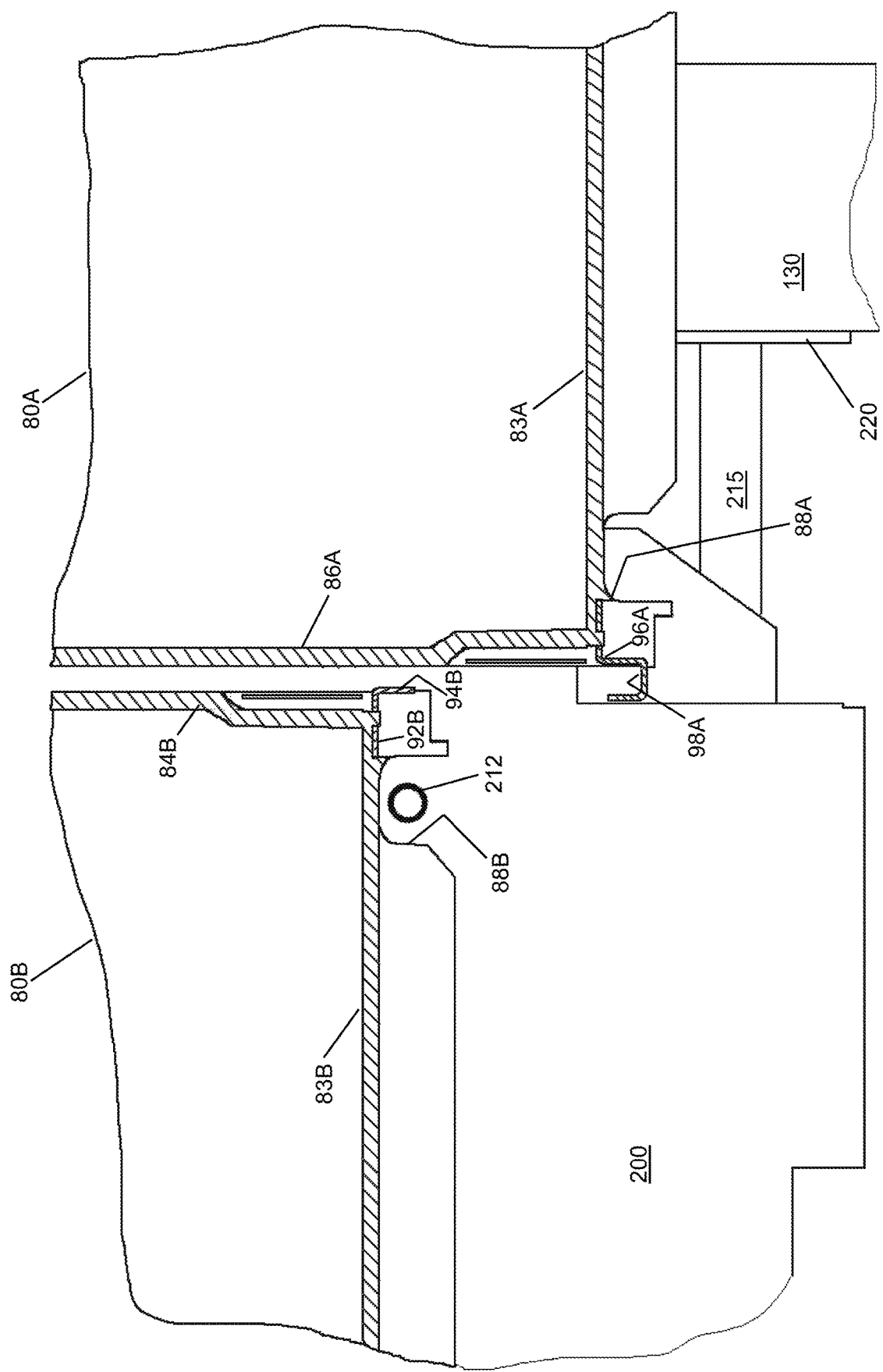
FIG. 14 is a fragmentary side view of a releasable connection between storage containers of the apparatus illustrated in FIG. 1, in which the storage containers are disconnected.

Referring to FIGS. 13-14, a releasable connector 90 is illustrated for releasably connecting adjacent containers 80A, 80B. The connector 90 may facilitate displacement of one of the containers from a remote storage location 57 to an inner storage location 55. The releasable connector 90 may be cooperating hooks or latches. For instance, the releasable connector 90 may be formed of a pair of cooperable connectors 92B, 96A. A forward connector 92 may be connected with the forward end 84 of the container 80 and a rearward connector 96 may be connected with the rearward end of the container 80. In this way, the forward connector 92B of a first container 80B is releasably connectable with the rearward connector 96A of a second container 80A to connect the two containers. In one embodiment, the forward connector 92 is a hook in the form of a tongue extending downwardly generally vertically (see 92B in FIG. 14). The forward connector 92 projects downwardly from a recess adjacent the forward end of the container. In the present instance, the forward connector is an L-shaped bracket. The L-shaped bracket may have a body portion rigidly and fixedly connected with the bottom of the container. For example, the body portion of the forward connector 92 may extend substantially horizontally and may be affixed to the container by a fastener extending through the connector 92 and into the container. The tongue 94 of the forward connector may project transverse the body portion so that the tongue projects downwardly to form a vertical hook or flange that engages the second connector 96. As shown in FIG. 13, the forward connector may be connected to the container forwardly of the groove 88 used to engage the loading/unloading mechanism 212 of the vehicle.

The rearward connector 96 may be a second hook that cooperates with the first hook 92. The rearward connector 96 may project rearwardly from the rearward end of the container 80. In the present instance, the second connector 96 incorporates a hook or flange that projects vertically upwardly. Specifically, the second connector 96 may comprise a groove or channel 98 configured to receive the tongue 94 of the first connector 92. The channel 98 may be connected to a rearward end 86 of the container 80 so that the channel projects rearwardly from the rearward end. The second connector may have a body portion rigidly and fixedly connected with the bottom of the container. For example, the body portion of the rear connector 96 may be a generally flat portion extending substantially horizontally and may be affixed to the container by a fastener extending through the connector 96 and into the container.

As shown in FIG. 13, the tongue 94B of the forward connector 92B of a first container 80B is inserted into the slot 98A of the rearward connector 96A of the second container 80A to connect the first and second containers. As discussed further below, the connection between the two containers allows the containers to move together when one of the containers is displaced. In this way, pulling a first container from an inner storage location onto a vehicle pulls a connected container from a remote storage location toward an inner storage location.

Track

Figure 3:
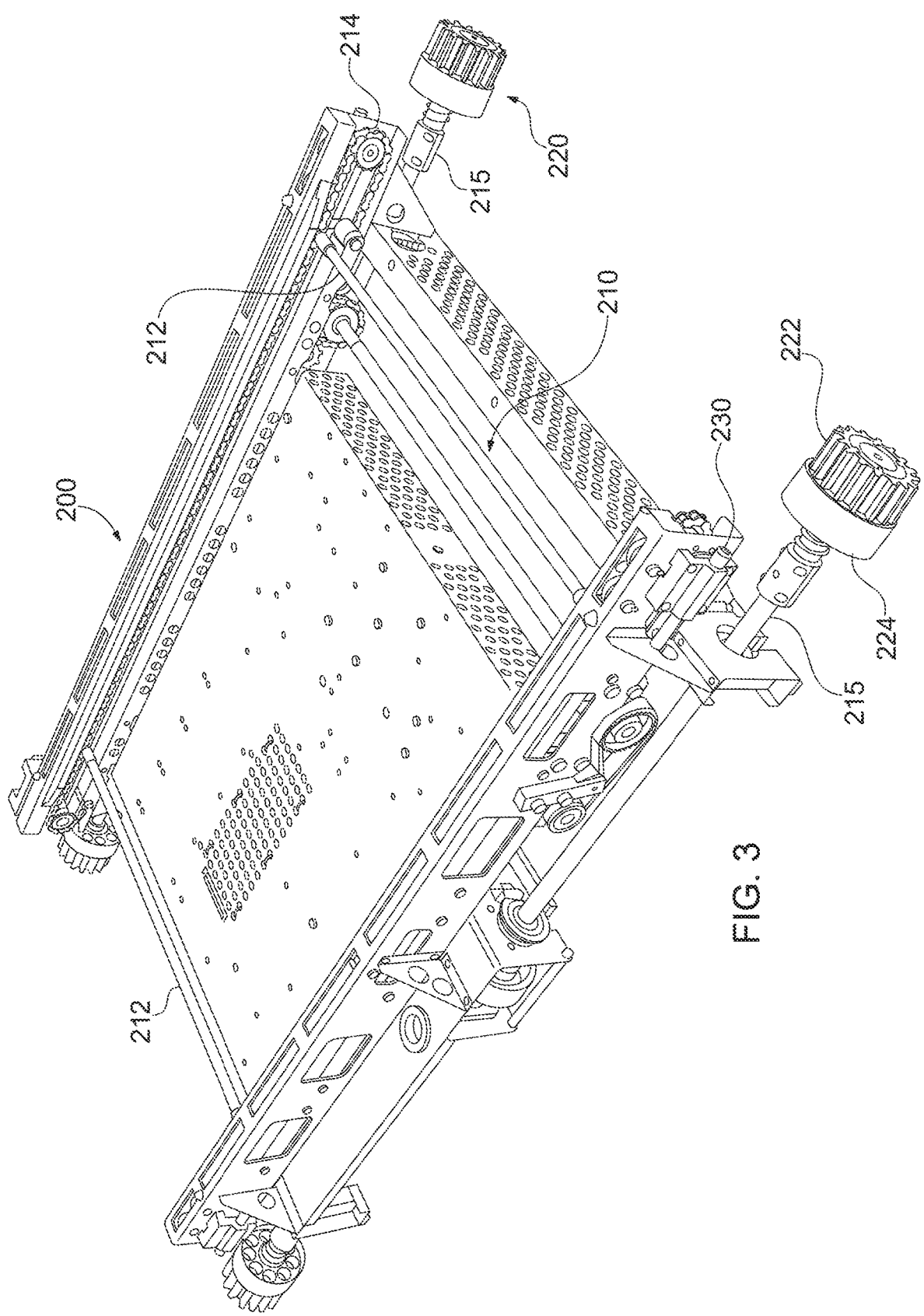
FIG. 3 is an enlarged perspective view of a vehicle of the storing and retrieving apparatus illustrated in FIG. 1.

As can be seen in FIGS. 1 and 12, a track may be provided adjacent the storage locations to direct the vehicles 200 to the storage locations. The track 110 may include a front track 115 and a rear track 120 that are parallel to one another to guide the vehicles around the track. As shown in FIG. 3, each of the vehicles includes four wheels 220: two forward wheel and two rearward wheels. The forward wheels 220 ride in the front track, while the rearward wheel ride in the rear track. It should be understood that in the discussion of the track the front and rear tracks 115, 120 are similarly configured opposing tracks that support the forward and rearward wheels 220 of the vehicles. Accordingly, a description of a portion of either the front or rear track also applies to the opposing front or rear track.

Referring to FIGS. 4-7, the details of the track will be described in greater detail, however, as noted above, it should be appreciated that the illustrated track is merely an exemplary track that can be used with the system. The precise configuration may vary according to the application and as noted above, the system may not include the track.

Figure 7:
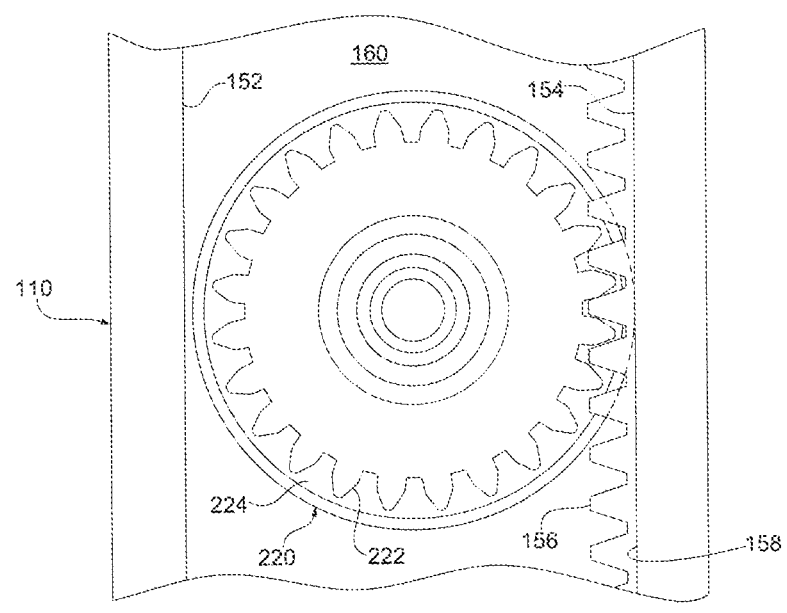
FIG. 7 is an enlarged fragmentary view of a wheel of the vehicle illustrated in FIG. 3 and a portion of the track illustrated in FIG. 2.

The track 110 may include an outer wall 152 and an inner wall 154 that is spaced apart from the outer wall and parallel to the outer wall. The track also may have a back wall 160 extending between the inner and outer walls. As can be seen in FIG. 7, the outer and inner walls 152, 154 and the back wall form a channel. The wheels 220 of the vehicle ride in this channel.

The track may include both a drive surface 156 and a guide surface 158. The drive surface positively engages the vehicles to enable the vehicle to travel along the track. The guide surface 158 guides the vehicle, maintaining the vehicle in operative engagement with the drive surface 156. In the present instance, the drive surface is formed of a series of teeth, forming a rack that engages the wheels of the vehicles as described further below. The guide surface 158 is a generally flat surface adjacent the rack 156. The rack 156 extends approximately halfway across the track and the guide surface 158 extends across the other half of the track. As shown in FIGS. 4-7, the rack 156 may be formed on the inner wall 154 of the track. The opposing outer wall 152 may be a generally flat surface parallel to the guide surface 158 of the inner wall.

As described above, the track 110 may include a plurality of vertical legs extending between the horizontal upper and lower rails 135, 140. An intersection 170 may be formed at each section of the track at which one of the vertical legs intersects one of the horizontal legs. Each intersection may include an inner branch 172 that is curved and an outer branch 176 that is generally straight. The intersections of the vertical legs with the lower rail incorporate similar intersections, except the intersections are reversed.

Each intersection 170 may include a pivotable gate 180 that may have a smooth curved inner race and a flat outer race that has teeth that correspond to the teeth of the drive surface 156 for the track. The gate 180 may pivot between a first position and a second position. In the first position, the gate 180 is closed so that the straight outer race 184 of the gate is aligned with the straight outer branch 176 of the intersection. In the second position, the gate is open so that the curved inner race 182 of the gate is aligned with the curved branch 172 of the intersection.

Accordingly, in the closed position, the gate is pivoted downwardly so that the outer race 184 of the gate aligns with the drive surface 156. In this position, the gate blocks the vehicle from turning down the curved portion, so that the vehicle continues straight through the intersection. In contrast, as illustrated n FIG. 6, when the gate is pivoted into the open position, the gate blocks the vehicle from going straight through the intersection. Instead, the curved inner race 182 of the gate aligns with the curved surface of the inner branch 172 and the vehicle turns through the intersection. In other words, when the gate is closed, a vehicle goes straight through the intersection along either the upper rail 130 or the lower rail, depending on the location of the intersection. When the gate is opened, the gate directs the vehicle from either a vertical rail to a horizontal rail or from a horizontal rail to a vertical rail, depending on the location of the intersection.

In the foregoing description, the gates allow one of the vehicles to either continue in the same direction (e.g. horizontally) or turn in one direction (e.g. vertically). However, in some applications, the system may include more than two horizontal rails that intersect the vertical columns. In such a configuration, it may be desirable to include a different rail that allows the vehicles to turn in more than one direction. For instance, if a vehicle is traveling down a column, the gate may allow the vehicle to turn either left or right down a horizontal rail, or travel straight through along the vertical column. Additionally, in some instances, the vehicles may travel upwardly.

Figure 4:
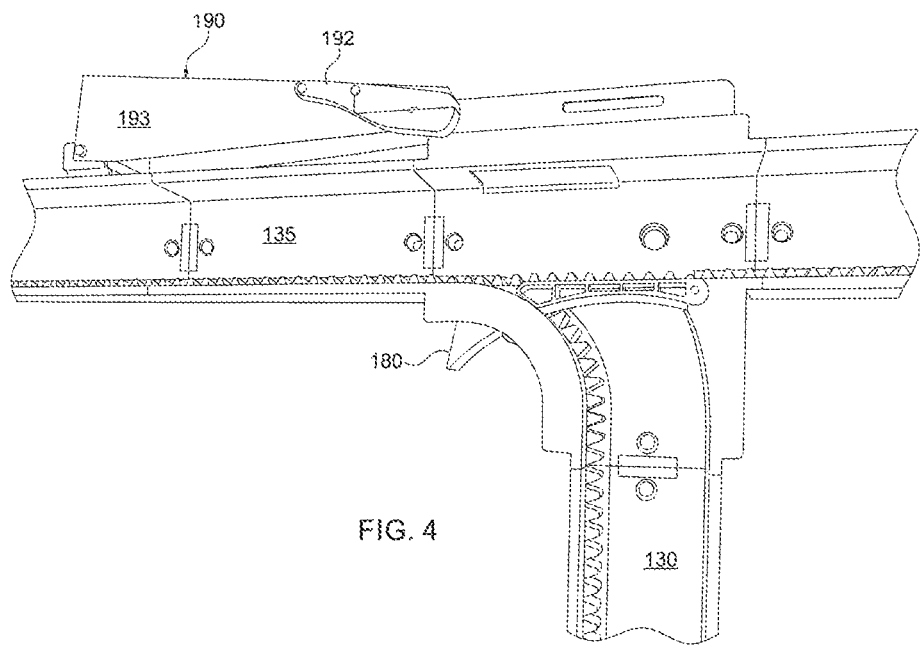
FIG. 4 is an enlarged perspective view of a gate of the track illustrated in FIG. 2.

Since the system 10 includes a number of vehicles 200, the positioning of the vehicles is controlled to ensure that the different vehicles do not crash into each other. In one embodiment, the system 10 uses a central controller that tracks the position of each vehicle 200 and provides control signals to each vehicle to control the progress of the vehicles along the track. The central controller may also control operation of the various elements along the track, such as the gates 180. Alternatively, the gates may be actuated by the vehicles 200. For instance, referring to FIGS. 4-5, the gates 180 may include a passive actuator 190 that responds to an actuator 230 on the vehicles. If the actuator on the vehicle engages the gate actuator 190 then the gate moves from a first position to a second position. For instance, as shown in FIG. 4, the gate is in a first position so that the vehicle will remain along the horizontal rail 135. If the gate actuator 230 on the vehicle 200 engages the actuator 190 on the gate, the gate 180 will pivot upwardly into a second position so that the vehicle will turn and move downwardly along the vertical rail 130.

Figure 5:
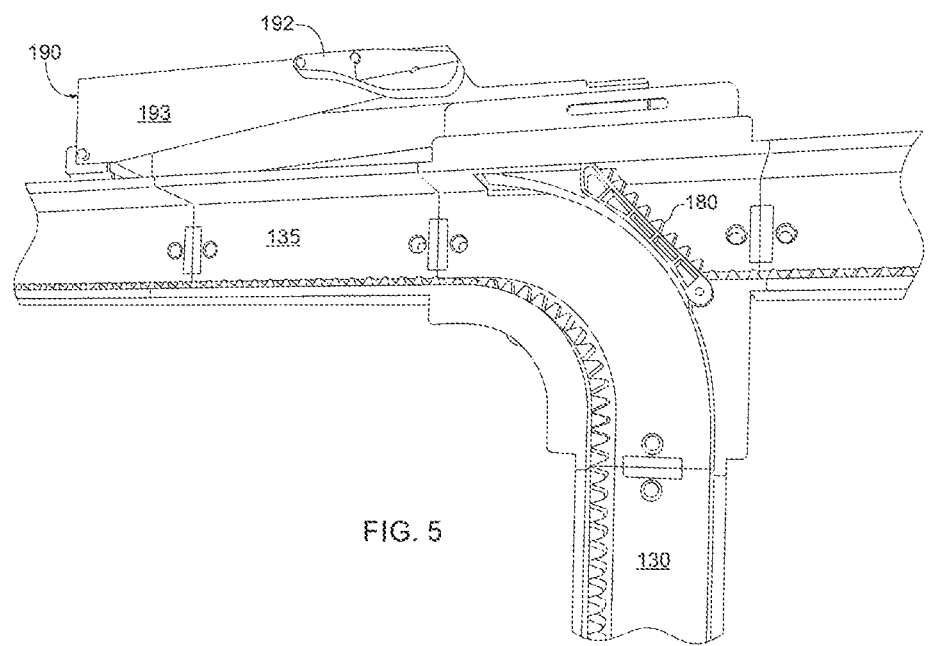
FIG. 5 is an enlarged perspective view of a gate of the track illustrated in FIG. 2.
Figure 6:
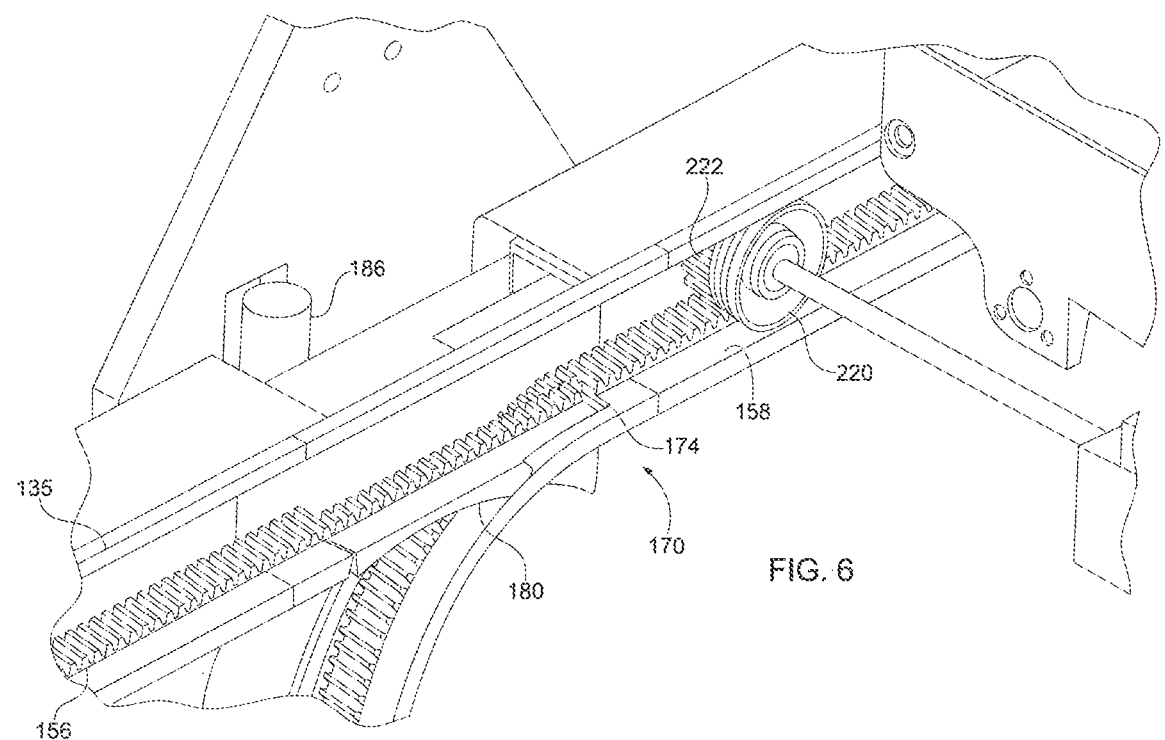
FIG. 6 is an enlarged perspective view of a gate of the track illustrated in FIG. 2.

The actuators 190 on the gates may be moveable actuation surfaces 192 connected to the gate by a linkage. For instance, the actuation surface 192 may be mounted on a pivotable arm 193. To actuate the gate and move it from the first position to the second position, the gate actuator 230 on the vehicle contacts the actuation surface 192. The actuation surface is angled similar to a ramp, so that as the vehicle advances toward the gate, the gate actuator on the vehicle engages the actuation surface and progressively displaces the arm 193 upwardly. The arm 193 may be connected to the gate 180 by a linkage. Accordingly, when the arm 193 pivots, the gate pivots as well. In this way, the actuator 230 on the vehicle engages the actuator on the gate to move the gate from the first position to the second position as shown in FIGS. 4-5. After the vehicle 200 passes an open gate, such as shown in FIG. 5, the gate may return to the closed position shown in FIG. 4. The gate may close automatically, such as by a biasing element or the weight of the gate and/or actuator.

Delivery Vehicles

Referring to FIG. 3, the details of the delivery vehicles 200 will be described in greater detail. Each delivery vehicle is a semi-autonomous vehicle that may have an onboard drive system, including an onboard power supply. Each vehicle may also include a mechanism for loading and unloading items for delivery. Optionally, each vehicle may also include a gate actuator 230 for selectively actuating the gates 180 to allow the vehicle to selectively change direction.

The vehicle 200 may incorporate any of a variety of mechanisms for loading an item onto the vehicle and discharging the item from the vehicle into one of the bins. Additionally, the loading/unloading mechanism 210 may be specifically tailored for a particular application. In the present instance, the loading/unloading mechanism 210 may comprise a displaceable element configured to engage an item stored at a storage location 190 and pull the item onto the vehicle. More specifically, in the present instance, the vehicle includes a displaceable element configured to move toward a container 80 in a storage location 50. After the displaceable element engages the container 80, the displaceable element is displaced away from the storage location 50, thereby pulling the container onto the vehicle 200.

In the present instance, the loading/unloading mechanism 210 may comprise a displaceable rod or bar 212. The bar 212 may extend across the width of the vehicle 200 and both ends may be connected with drive chains that extend along the sides of the vehicle. A motor may drive the chains to selectively move the chain toward or away from storage locations. For example, as the vehicle approaches a storage location to retrieve a container 80, the chain may drive the rod 212 toward the storage location so that the bar engages a groove or notch 88 in the bottom of the container 80. The chain then reverses so that the bar 212 moves away from the storage location 50. Since the bar is engaged in the notch 88 in the container, as the bar moves away from the storage location, the bar 212 pulls the container onto the vehicle. In this way, the loading/unloading mechanism 210 may be operable to retrieve items from a storage location. Similarly, to store an item in a storage location 50, the chain of the loading/unloading mechanism 210 drives the bar 212 toward the storage location until the item is in the storage location. The vehicle may then moves downwardly to disengage the bar from the container 80, thereby releasing the container. Alternatively, the loading/unloading mechanism may be configured so that the bar 212 is driven downwardly, out of engagement with the notch 88.

Additionally, since the system 10 includes an array of storage locations 50 adjacent the front side of the track 110 and a second array of storage locations adjacent the rear side of the track, the loading/unloading mechanism 210 is operable to retrieve and store items in the forward array and the rearward array. Specifically, as shown in FIG. 3, the loading/unloading mechanism 210 includes two bars spaced apart from one another. One bar is operable to engage containers in the forward array, while the second bar is operable to engage containers in the rearward array of storage locations.

The vehicle 200 may include four wheels 220 that are used to transport the vehicle along the track 110. The wheels 220 may be mounted onto two parallel spaced apart axles 215, so that two of the wheels are disposed along the forward edge of the vehicle and two of the wheels are disposed along the rearward edge of the vehicle.

The vehicle may include an onboard motor for driving the wheels 220. More specifically, the drive motor may be operatively connected with the axles to rotate the axles 215, which in turn rotates the gears 222 of the wheels. The drive system for the vehicle may be configured to synchronously drive the vehicle along the track. In the present instance, the drive system is configured so that each gear is driven in a synchronous manner.

The vehicle 200 may be powered by an external power supply, such as a contact along the rail that provides the electric power needed to drive the vehicle. However, in the present instance, the vehicle includes an onboard power source that provides the requisite power for both the drive motor and the motor that drives the load/unload mechanism 210. Additionally, in the present instance, the power supply is rechargeable. Although the power supply may include a power source, such as a rechargeable battery, in the present instance, the power supply is made up of one or more ultracapacitors. The ultracapacitors can accept very high amperage to recharge the ultracapacitors. By using a high current, the ultracapacitors can be recharged in a very short time, such as a few seconds or less.

The vehicle includes one or more contacts for recharging the power source. In the present instance, the vehicle includes a plurality of brushes, such as copper brushes that are spring-loaded so that the brushes are biased outwardly. The brushes cooperate with a charging rail to recharge the power source.

Each vehicle may include a load sensor for detecting that an item is loaded onto the vehicle. The sensor(s) may be used to detect whether the item is properly positioned on the vehicle. For instance, the load sensor may include a force detector detecting a weight change or an infrared sensor detecting the presence of an item.

The vehicle may further include a processor for controlling the operation of the vehicle in response to signals received from a central processor of the system. Additionally, the vehicle may include a wireless transceiver so that the vehicle can continuously communicate with the central processor as it travels along the track. Alternatively, in some applications, it may be desirable to incorporate a plurality of sensors or indicators positioned along the track. The vehicle may include a reader for sensing the sensor signals and/or the indicators, as well as a central processor for controlling the operation of the vehicle in response to the sensors or indicators.

Pick Station and Track

Figure 2:
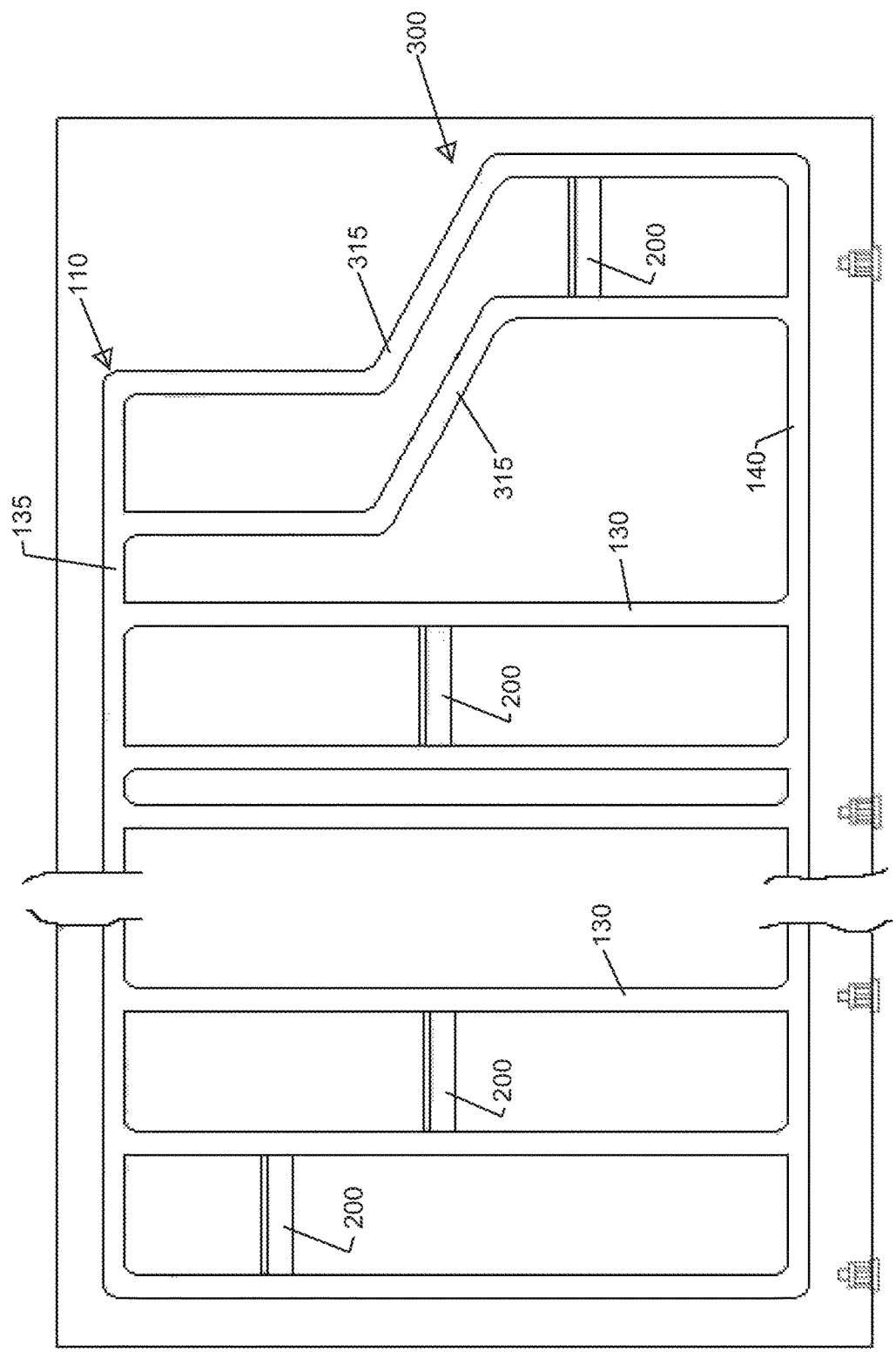
FIG. 2 is a fragmentary side view, illustrating a track of the storing and retrieving apparatus illustrated in FIG. 1.

As described previously, the system 10 may be configured so that the vehicles 200 retrieve items from the storage locations 50 and transport the items to the pick station 300. Referring now to FIGS. 1-2 the pick station 300 will be described in greater detail.

In one mode of operation, the system 10 is used to retrieve items needed to fill an order. The order may be an internal order, such as parts needed in a manufacturing process in a different department, or the order may be a customer order that is to be filled and shipped to the customer. Either way, the system automatically retrieves the items from the storage areas and delivers the items to the picking station so that an operator can pick the required number of an item from a container. After the item is picked from a container, the vehicle advances so that the next item required for the order is advanced. The system continues in this manner so that the operator can pick all of the items needed for an order.

In the present instance, the pick station 300 is positioned at one end of the array of storage locations. However, it may be desirable to incorporate multiple pick stations positioned along the track 110. For instance, a second pick station can be positioned along the opposite end of the array of storage locations. Alternatively, multiple pick stations can be provided at one end. For instance, a second pick station may be positioned above a first pick station at one end of the aisle.

The pick station 300 may be configured so that the vehicle travels upwardly to present the contents to the operator so that the operator can more easily retrieve items from the container 80. Referring to FIGS. 1-2, at the picking station the track includes a curved section 315 that bends upwardly and away from the operator. In this way, the vehicle moves upwardly and then stops at a height that facilitates the operator removing items from the container. After the operator removes items from the container, the vehicle moves laterally away from the operator and the vertically to the upper horizontal rail 135.

The system can be configured so that the vehicles tilt at the pick station 300 thereby making it easier for the operator to retrieve items from the container. For instance, as the vehicle approaches the pick station, the controller may control the vehicle so that the rearward set of wheels continue to drive after the forward set of wheel stop. This raises the rearward edge of the vehicle (from the perspective of the operator). After the operator picks the items from the container, the forward set of wheels (relative to the operator) drive first, thereby level off the vehicle. Once leveled, the four wheels drive synchronously.

Although the vehicles may be tilted by controlling operation of the vehicles, if the wheels of the vehicles positively engage drive elements in the track, such as the toothed wheels 220 that mesh with teeth in the track as described above, the wheels 220 may bind if the rear wheels are driven at a different rate than the forward wheels. Accordingly, the track system may be modified so that the track moves to tilt the container toward the operator.

Referring to FIGS. 1 and 2, the details of the track system in the picking station 300 will be described in greater detail. At the end of the columns of storage locations, the track curves outwardly away from the vertical columns of the system to form the curved track 315 of the pick station 300. The track sections of the pick station include parallel forward track sections that support and guide the forward axle 215 of the vehicles 200 and parallel rearward track sections that support and guide the rear axle 215 of the vehicles. The forward track sections extend vertically upwardly and then curve back toward the vertical columns of storage locations. The rearward track sections are substantially parallel to the forward track sections and curve substantially similarly to the forward track sections. In this way, the forward and rearward track sections guide the vehicles so that the vehicles can maintain a substantially horizontal orientation as the vehicles are driven along the curved track 315.

The rearward track sections may be configured so that the rearward axle of the vehicle 200 can be lifted while the vehicle is stopped at the pick station 300. By lifting the rearward axle of the vehicle 200, the container on the vehicle is tilted to present the contents of the container to the operator to facilitate the picking process.

The pick station 300 may include a plurality of items to improve the efficiency of the pick station. For instance, the pick station may include a monitor to display information to aid the operator. As the vehicle approaches the pick station, the system 10 may display information such as how many items need to be picked from the container for the order. Additionally, since the operator may pick items for multiple orders, the system may display which order(s) the item is to be picked for, in addition to how many of the item are to be picked for each order. The system may also display information such as how many items should be remaining in the container after the operator picks the appropriate number of items from the container.

One feature of the system as described above is that the orientation of the vehicles does not substantially change as the vehicles move from travelling horizontally (along the upper or lower rails) to vertically (down one of the columns). Specifically, when a vehicle is travelling horizontally, the two front geared wheels 220 cooperate with the upper or lower horizontal rail 135 or 140 of the front track 115, and the two rear geared wheels 220 cooperate with the corresponding upper or lower rail 135 or 140 of the rear track 120. As the vehicle passes through a gate and then into a column, the two front geared wheels engage a pair of vertical legs 130 in the front track 115, and the two rear geared wheels engage the corresponding vertical legs in the rear track 120. It should be noted that when it is stated that the orientation of the vehicles relative to the horizon do not change, this refers to the travel of the vehicles around the track. Even though the vehicles may tilt relative to the horizon at the picking station, the vehicles are still considered to remain in a generally constant orientation relative to the horizon as the vehicles travel along the track 110.

As the vehicle travels from the horizontal rails to the vertical columns or from vertical to horizontal, the tracks allow all four geared wheels to be positioned at the same height. In this way, as the vehicle travels along the track it does not skew or tilt as it changes between moving horizontally and vertically. Additionally, it may be desirable to configure the vehicles with a single axle. In such a configuration, the vehicle would be oriented generally vertically as opposed to the generally horizontal orientation of the vehicles described above. In the single axle configuration, the weight of the vehicles would maintain the orientation of the vehicles. However, when using a single axle vehicle, the orientation of the storage locations would be re-configured to accommodate the vertical orientation of the vehicles.

Operation

Once the central controller determines the appropriate storage location 50 for the item, the route for a vehicle leaving the pick station 300 may be determined. Specifically, the central controller may determine the route for the vehicle and communicates information to the vehicle regarding the storage location into which the item is to be delivered. The central controller may then control the operation of the vehicle to actuate gates along the track as necessary to direct the vehicle to the storage location into which the item is to be delivered. Once the vehicle reaches the appropriate storage location, the vehicle stops at the storage location 50 and the container is displaced into the appropriate storage location. For example, the vehicle may be stopped at the appropriate storage location 100 and the onboard controller on the vehicle may send an appropriate signal to the vehicle to drive the chain 214, which advances the bar 212. Since the bar 212 is engaged in the slot 88 in the container, the bar drives the container off the vehicle and into the appropriate storage location.

After discharging the item, the vehicle 200 may travel to a second storage location to retrieve the next item to be transported to the picking station. After retrieving the item, the vehicle 200 may travel down the vertical legs 130 of the column until it reaches the lower rail 140. Gates may direct the vehicle along the lower rail, and the vehicle may follow the lower rail to return to the pick station 300 to deliver another item.

If the vehicle 200 delivers a container to an empty storage location, then the operation of the vehicle proceeds as described above. Similarly, if the vehicle retrieves a container 80 that is not connected with another container, then the operation of the vehicle proceeds as described. In particular, the vehicle stops adjacent the container. The loading/unloading mechanism advances into engagement with the container and then the loading/unloading mechanism pulls the container onto the vehicle. In contrast, the operation of the vehicle is modified if the vehicle carries a container to be placed in a storage location that already contains a container. Similarly, the operation of the vehicle is modified if the vehicle is retrieving a container attached to a container in a remote storage location.

Referring now to FIGS. 9 and 10A-10H, the operation of vehicle in retrieving a container from a storage location having "n" deep containers will be described. FIG. 9 illustrates an exemplary embodiment in which two racks 35, 40 of storage containers 80 are illustrated. The racks 35, 40 are separated from one another by an aisle and the vehicle 200 travels within the space between the racks. In the illustrated embodiment, the rack includes storage locations that have a depth sufficient to store two storage containers. The portion of the storage location that accommodates the storage container adjacent the aisle is referred to in this discussion as the inner cell and is designated 55. The portion of the storage location behind the inner cell 55 is referred to as the remote cell and is designated 57.

In the illustrated embodiment, each container includes a front connector 92 connected to the front end of the container and a rear connector 96 connected to a rear end of the container. The front connector of the container in the remote cell connects with rear connector of the container in the inner cell to create a releasable connection designated 90.

In FIG. 9, storage container 80A is stored in a remote cell behind storage container 80B that is stored in an inner cell. Containers 80A, 80B are releasably connected to one another by a connector, such as connector 90. The containers 80A, 80B are generally aligned from a horizontal perspective. The vehicle 200 is stopped at a position adjacent the storage location that houses container 80A. The vehicle 200 is empty (i.e. no container is loaded on the vehicle). The load/unload mechanism 210 engages the container 80A as shown in FIG. 9. For example, as shown in FIGS. 11 and 12, the front edge of the container 80 may extend into the aisle beyond the track (e.g. vertical track sections 130). In particular, the transfer groove 88 of the container 80 may extend into the aisle. The load bar 212 extends outwardly toward the container, away from the platform of the vehicle until the load bar is inserted into the transfer groove 88.

Figure 10A:
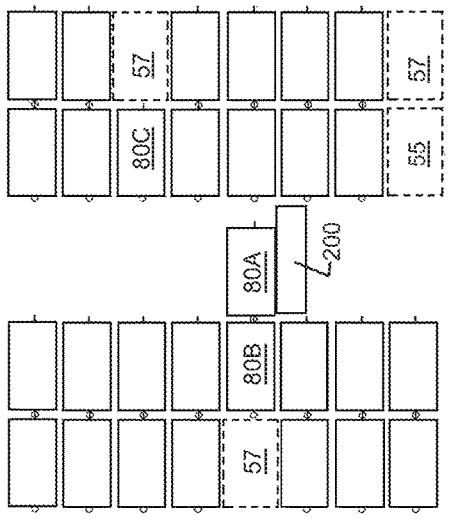
FIG. 10A is a diagrammatic view of the storage containers illustrated in FIG. 9, showing a step in the process of moving a storage container from one location to another.

Referring to FIG. 10A, the load mechanism pulls the container 80A onto the vehicle 200. As the container 80A in the inner cell is pulled onto the vehicle, the container 80A pulls the container 80B in the remote cell toward the inner cell. In particular, the connector 90 connects the inner and remote containers 80A, 80B so that the containers move horizontally together.

Figure 10B:
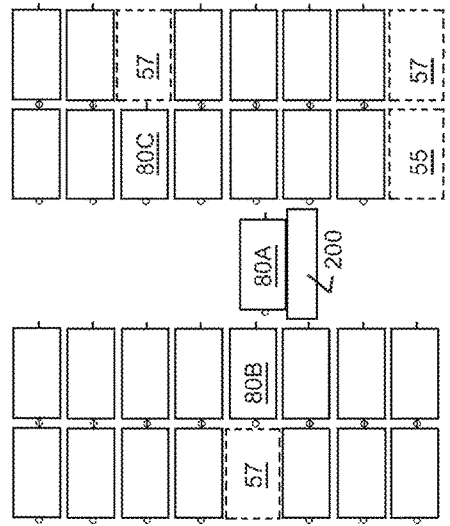
FIG. 10B is a diagrammatic view of the storage containers illustrated in FIG. 9, showing a step in the process of moving a storage container from one location to another.

Referring to FIG. 10B, vehicle continues to displace the container 80A onto the platform of the vehicle until the container is clear of the container in the storage location above the container. The displacement of container 80A pulls the remote container 80B into the inner cell so that container 80B has taken the place that container 80A had in the rack. It can be seen in FIG. 10B that by pulling container 80B into the inner cell, the remote cell 57 behind container 80B is now vacant.

As described above, the loading mechanism 210 of the vehicle loads the inner container 80A onto the vehicle, which in turns displaces the remote container 80B horizontally until the remote container is moved into a different storage locations, which in this instance is an inner cell. Continued displacement of the container 80A onto the vehicle would pull container 80B into the aisle and potentially onto the vehicle because the two containers remain connected. Accordingly, once the container 80B is displaced into the new storage location (i.e. the inner cell), the releasable connection 90 disconnects to thereby disconnect the two containers 80A, 80B.

Containers 80A, 80B may be disconnected in a variety of ways, depending on the mechanism that interconnects the containers. As noted previously, the connectors 92, 96 may be any of a variety of connectors that provide a releasable connection between two containers. The connectors may be mechanical or electro-mechanical. For example, the connectors 92, 96 could be magnetic elements, one of which may comprise an electro-magnet. The electro-magnet may be de-energized to disconnect the containers to facilitate relative motion of the first container relative to the second container. Alternatively, as described above, the connectors 92, 96 may be mechanical connectors, such as a pair of hooks or a tongue and groove arrangement. Accordingly, to disconnect the containers 80A, 80B, the connectors 92, 96 are disengaged. In one embodiment, the connectors 92, 96 are disengaged by displacing one of the containers vertically relative to the other container.

Figure 10C:
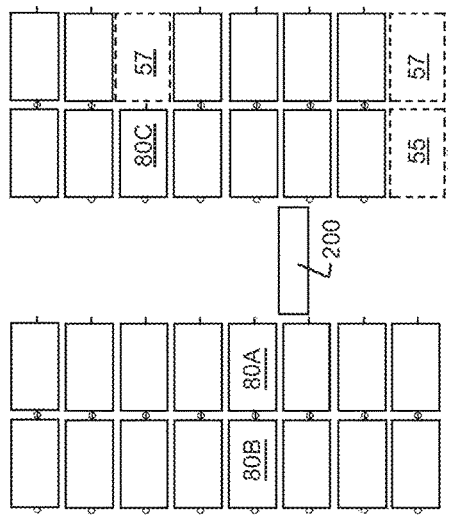
FIG. 10c is a diagrammatic view of the storage containers illustrated in FIG. 9, showing a step in the process of moving a storage container from one location to another.

Referring to FIG. 10C, once the first container 80A is loaded onto the vehicle so that the container 80A is clear of the containers immediately above it or below it in the column, the container 80A is displaced vertically to disconnect container 80A from container 80B. As shown in FIGS. 13-14, the tongue 94B of connector 92B may project downwardly into the groove 98A of connector 96A. Therefore, the vehicle moves downwardly to vertically displace container 80A downwardly until the tongue 94B of connector 92B disengages the groove 98A as shown in FIG. 14. In this way, displacing the vehicle 200 vertically disconnects container 80A from container 80B. It should be understood, that the connectors 92, 96 may be configured differently so that the connectors are disconnected by moving the vehicle upwardly, rather than lowering the vehicle.

Figure 10D:
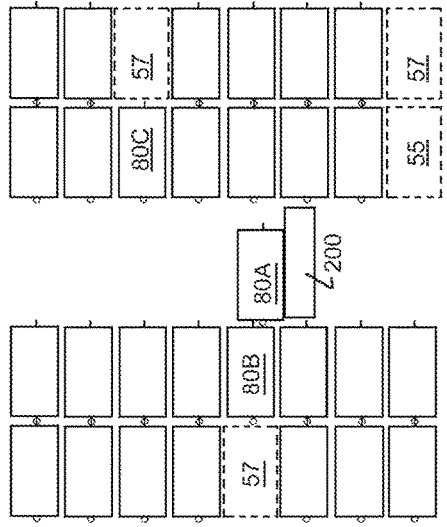
FIG. 10D is a diagrammatic view of the storage containers illustrated in FIG. 9, showing a step in the process of moving a storage container from one location to another.
Figure 10E:
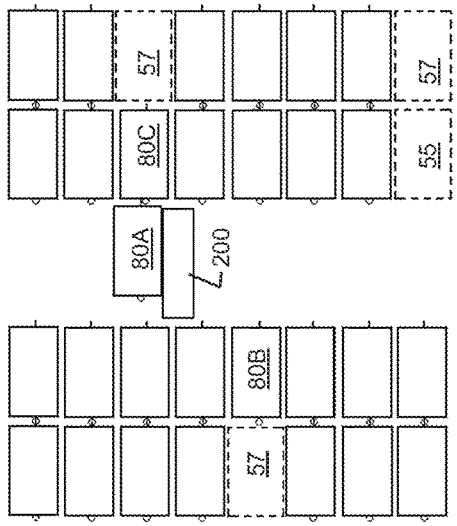
FIG. 10E is a diagrammatic view of the storage containers illustrated in FIG. 9, showing a step in the process of moving a storage container from one location to another.

Referring now to FIG. 10D, after the first container 80A is disconnected from the second container 80B, the container 80A is displaced horizontally on the vehicle away from the second container. The first container is displaced horizontally until is centered within the aisle such that the container is clear from interfering or engaging any of the vehicles in the rack when the vehicle moves vertically upwardly or downwardly in the column. Once the container 80A is completely loaded onto the vehicle, the vehicle may advance toward the picking station 300 or other transfer location or to a different storage location. For example, the vehicle may move down to the lower horizontal rail and then along the horizontal rail to deliver container 80A to the picking station 300. Alternatively, the container 80A may be transported to another storage location and unloaded into the storage location.

The details of the steps of unloading the container 80A on vehicle 200 into a storage location in which a third container designated 80C is located are described below in connection with FIGS. 10E-10H. The vehicle 200 moves into position adjacent an inner cell in rack 40 in which container 80C is stored. The container 80A is unloaded from the vehicle toward the third container 80C. As the container 80A is unloaded, the container 80A pushes the third container 80C deeper into the storage location in the rack. Doing so displaces container 80C horizontally from the inner cell into the remote cell 57. During the process of unloading the first container 80A and displacing container 80C, the first container 80A is connected to the third container 80C. As described previously, the connectors of the two containers may be connected in a variety of ways. In the present instance, the containers are connected by moving one of the containers relative to the other. Specifically, the first container 80A is displaced vertically relative to the third container 80C to connect the two containers.

Figure 10F:
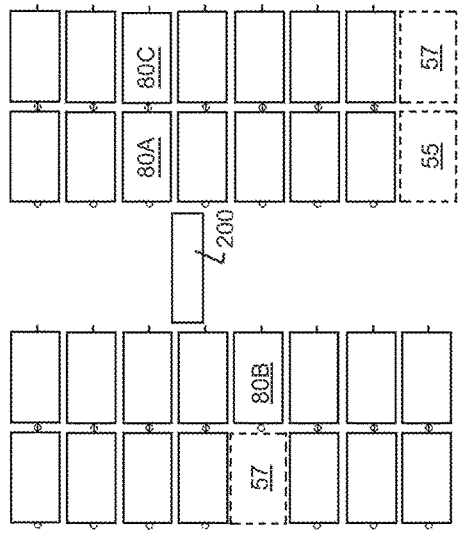
FIG. 10F is a diagrammatic view of the storage containers illustrated in FIG. 9, showing a step in the process of moving a storage container from one location to another.
Figure 10G:
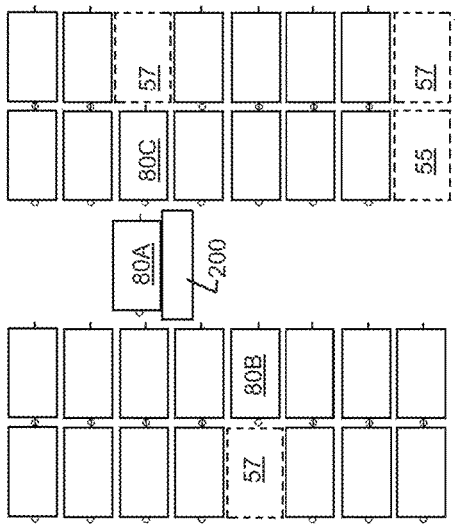
FIG. 10G is a diagrammatic view of the storage containers illustrated in FIG. 9, showing a step in the process of moving a storage container from one location to another.

Referring again to FIG. 10E, to unload the first container 80A, the vehicle is displaced along the track until the first container 80A is disposed vertically higher than the third container 80C. In particular, the vehicle is driven to a position adjacent the container so that the front connector of the first container is positioned above the rear connector of the third container 80C. The first container is then displaced horizontally toward the third container 80C to partially unload the container from the vehicle, as shown in FIG. 10F. In the present instance, the first container is displaced until the front connector of the first container is aligned with the rear connector of the third container 80C. In particular, the unloading mechanism 210 of the vehicle displaces the container 80A horizontally until the tongue 94 of the front connector 92 is aligned with the groove 98 of the rear connector 96 on the third container 80C.

Figure 10H:
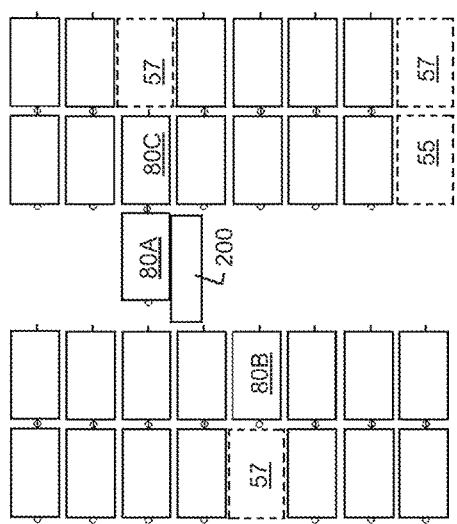
FIG. 10H is a diagrammatic view of the storage containers illustrated in FIG. 9, showing a step in the process of moving a storage container from one location to another.

Once the connectors of container 80A and 80C are aligned, the vehicle moves vertically to connect the containers. Specifically, referring to FIG. 10G, the vehicle moves downwardly to horizontally align containers 80A and 80C and to interconnect the two containers. Once the first container 80A is aligned horizontally with the storage location, the first container is unloaded from the vehicle into the storage location as shown in FIG. 10H. For instance, in the present embodiment, the loading/unloading mechanism of the vehicle drives the first container 80A off of the vehicle and into the inner cell in which the third container 80C was located. As the first container is driven into the inner cell, the first container 80A pushes the third container 80C deeper into the storage location so that the third container is moved into the remote cell (designated 57 in FIG. 10G).

As described above, the first container 80A is moved into position adjacent the third container 80C. The two containers are then connected before unloading the first container into the storage rack. In this way, the containers are linked so that subsequently, the third container in the remote cell can be pulled toward the aisle when the first container 80A is retrieved (see e.g. FIGS. 10A-10D and description above). However, it should be appreciated that the containers do not need to be connected in order to unload the first container and move the third container into the remote cell. Specifically, since the first container 80A pushes the third container 80C rearwardly into the rear cell, the containers do not need to be connected prior to unloading the first container. Therefore, depending on the configuration of the front and rear connectors, the containers may be connected to one another after the first container is unloaded from the vehicle.

Accordingly, as described above, the system may be configured to incorporate multi-depth storage locations in which containers are stored behind one another in a common horizontal storage location. The containers in a common horizontal storage location may be interconnected so that retrieving one of the containers in the common storage location displaces the other containers in the common storage location forwardly toward the vehicle. In the above description, the operation has been described in which a first container is loaded onto a delivery vehicle, thereby pulling a container from a remote cell into an inner cell so that the container can be retrieved from the inner cell. The vehicle can then deliver the first container to a different storage locations and then return to retrieve the second container that was displaced into the inner cell. Alternatively, in certain instance, a storage location housing two containers (such as containers 80A and 80B shown in FIG. 9) may be located across from an open storage location vertically and horizontally aligned with the two containers. In such an instance, the first container 80A may be loaded onto the vehicle, thereby pulling the second container toward the vehicle. Rather than disconnecting the two containers as described above, the first container 80A is further displaced horizontally to unload the container into a storage location in the opposing rack. As the first container 80A is unloaded into the storage location, the second container 80B is pulled onto the vehicle. The second container can then be disconnected from the first container so that the vehicle can deliver the second container to the picking station or a different storage location. For instance, the vehicle can be displaced vertically to disconnect the second container from the first container.

In the foregoing description, a system is described in which containers are stored in multi-depth storage locations. A container in a remote cell of a multi-depth storage location may be retrieved by a vehicle first retrieving a container that is in front of the container in the remote cell. The retrieved container is then transported away by the vehicle. The retrieved container may then be stored in a different location so that the vehicle can return to retrieve the container that was located in the remote cell. Alternatively, a first vehicle may retrieve the container that is in front of the container in the remote cell and a second vehicle may come and retrieve the vehicle that was located in the remote cell.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A material handling system for storing or retrieving a plurality of storage containers, comprising:
    a plurality of vehicles for delivering and retrieving storage containers, wherein each vehicle comprises an onboard motor for driving the vehicle;
    a first rack of storage locations;
    a second rack of storage locations spaced apart from the first rack with an aisle between the first and second racks;
    wherein the vehicles are displaceable in a vertical direction within the aisle and horizontally transverse the vertical direction;
    a plurality of storage locations wherein each storage location is configured to receive a plurality of the storage containers;
    wherein a first of the storage containers comprises a first connector at a first end and a second of the storage containers comprises a second connector at a second end, wherein the first connector is releasably connectable with the second connector to releasably connect the first and second storage containers at one of the storage locations;
    wherein each vehicle comprises a transfer mechanism configured to displace the first and second storage containers between the vehicle and the one storage location wherein the releasable connection between the first and second containers is operable to displace the second storage container when the transfer mechanism displaces the first storage container.

2. The apparatus of claim 1 comprising a track for guiding the vehicles, wherein the track comprises:
    a plurality of horizontal track sections spaced apart from one another and extending in a generally horizontal direction;
    a plurality of vertical track sections spaced apart from one another and extending in a generally vertical direction, wherein the vertical track sections intersect the horizontal track sections to form a loop; and
    an intersection where one of the horizontal track sections intersects one of the vertical track sections, wherein the intersection provides a first path in a generally horizontal direction and a second path in a generally vertical direction.

3. The apparatus of claim 1 wherein the connection of the first and second connectors impedes horizontal displacement of the first container relative to the second container.

4. The apparatus of claim 3 wherein the connection of the first and second connectors is sufficient to support the weight of the second container during horizontal displacement such that displacing the first container horizontally displaces the second container horizontally when the first and second connectors are connected.

5. The apparatus of claim 3 wherein the connection of the first and second connectors permits vertical displacement of the first container relative to the second container.

6. The apparatus of claim 5 wherein the first and second connectors are configured such that vertical displacement of the vehicle along the track disconnects the first and second connectors.

7. The apparatus of claim 3 wherein the first and second connectors are configured such that displacement of the first connector vertically relative to the second connector disconnects the first connector from the second connector.

8. The apparatus of claim 1 wherein the first connector comprises a tongue and the second connector comprises a groove configured to receive the tongue.

9. The apparatus of claim 1 wherein the storage location in which the first and second containers are located is configured to house the first and second containers in horizontal alignment wherein the first container is positioned in front of the second container.

10. The apparatus of claim 9 wherein when one of the vehicles is aligned with the first container, the first container separates the second container from the vehicle.

11. The apparatus of claim 1 wherein the one of the storage locations has a depth and the first and second container each have a length, wherein the depth of the one storage location is at least as long as the combined length of the first and second containers.

12. The apparatus of claim 1 wherein the vehicles comprise a generally planar platform for receiving the containers.

13. The apparatus of claim 1 wherein a pick station is disposed at an end of the aisle, wherein the vehicles deliver containers to the pick station so that operators can retrieve items from the containers at the pick station.

14. The apparatus of claim 2 wherein the vehicles comprise drive wheels that engage the track and wherein the racks are positioned relative to the track so that the containers project horizontally into the aisle beyond the track.

15. The apparatus of claim 1 wherein the containers contain one or more engagement elements configured to engage the transfer mechanism of the vehicles.

16. A material handling system for storing or retrieving a plurality of storage containers, comprising:
a plurality of independently operable vehicles for delivering and retrieving storage containers, wherein each vehicle comprises an on-board motor for driving the vehicle;
a first rack of storage locations wherein a plurality of the storage locations are vertically spaced apart from one another forming a first vertical column;
a second rack of storage locations wherein a plurality of the storage locations are vertically spaced apart from one another forming a second vertical column spaced apart from the first vertical column with an aisle between the first and second vertical columns;
a track configured to guide the vehicles to the storage locations;
wherein the vehicles are displaceable in the aisle in a vertical direction along the track and displaceable horizontally transverse the vertical direction;
a plurality of storage containers wherein each storage location is configured to receive a plurality of the storage containers so that a first container positioned in a first storage location is adjacent the aisle and a second container positioned in the first storage location is spaced from the aisle by the first container;
wherein the first storage containers comprise a first connector at a first end and the second the storage containers comprises a second connector at a second end, wherein the second connector is releasably connectable with the first connector to releasably connect the first and second storage containers at the first storage location;
wherein each vehicle comprises a transfer mechanism configured to displace the first and second storage containers between the vehicle and the first storage location wherein the releasable connection between the first and second containers is operable to displace the second storage container when the transfer mechanism displaces the first storage container.

17. The apparatus of claim 16 wherein the track comprises:
a plurality of horizontal track sections spaced apart from one another and extending in a generally horizontal direction;
a plurality of vertical track sections spaced apart from one another and extending in a generally vertical direction, wherein the vertical track sections intersect the horizontal track sections to form a loop; and
an intersection where one of the horizontal track sections intersects one of the vertical track sections, wherein the intersection provides a first path in a generally horizontal direction and a second path in a generally vertical direction.

18. The apparatus of claim 16 wherein the connection of the first and second connectors impedes horizontal displacement of the first container relative to the second container.

19. The apparatus of claim 18 wherein the connection of the first and second connectors is sufficient to support the weight of the second container during horizontal displacement such that displacing the first container horizontally displaces the second container horizontally when the first and second connectors are connected.

20. The apparatus of claim 18 wherein the connection of the first and second connectors permits vertical displacement of the first container relative to the second container.

21. The apparatus of claim 20 wherein the first and second connectors are configured such that vertical displacement of the vehicle along the track disconnects the first and second connectors.

22. The apparatus of claim 18 wherein the first and second connectors are configured such that displacement of the first connector vertically relative to the second connector disconnects the first connector from the second connector.

23. The apparatus of claim 16 wherein the first connector comprises a tongue and the second connector comprises a groove configured to receive the tongue.

24. The apparatus of claim 16 wherein the first storage location is configured to house the first and second containers in horizontal alignment wherein the first container is positioned in front of the second container.

25. The apparatus of claim 16 wherein the first storage location has a depth and the first and second container each have a length, wherein the depth of the first storage location is at least as long as the combined length of the first and second containers.

26. The apparatus of claim 16 wherein the vehicles comprise a generally planar platform for receiving the containers.

27. The apparatus of claim 16 wherein the vehicles comprise drive wheels that engage the track and wherein the racks are positioned relative to the track so that the containers project horizontally into the aisle beyond the track.

28. The apparatus of claim 16 wherein the containers contain one or more engagement elements configured to engage the transfer mechanism of the vehicles.

* * * * *